United States Patent
Marti et al.

(10) Patent No.: US 9,481,287 B2
(45) Date of Patent: Nov. 1, 2016

(54) ROADWAY PROJECTION SYSTEM

(71) Applicant: HARMAN INTERNATIONAL INDUSTRIES, INC., Stamford, CT (US)

(72) Inventors: Stefan Marti, Oakland, CA (US); Davide Di Censo, San Mateo, CA (US); Ajay Juneja, Mountain View, CA (US)

(73) Assignee: HARMAN INTERNATIONAL INDUSTRIES, INC., Stamford, CT (US)

( * ) Notice: Subject to any disclaimer, the term of this patent is extended or adjusted under 35 U.S.C. 154(b) by 110 days.

(21) Appl. No.: 14/160,348

(22) Filed: Jan. 21, 2014

(65) Prior Publication Data
US 2015/0203023 A1     Jul. 23, 2015

(51) Int. Cl.
| | |
|---|---|
| *B60Q 1/00* | (2006.01) |
| *B60W 50/00* | (2006.01) |
| *B60W 30/10* | (2006.01) |
| *G01C 21/36* | (2006.01) |

(Continued)

(52) U.S. Cl.
CPC ............... *B60Q 1/00* (2013.01); *B60Q 1/085* (2013.01); *B60Q 1/503* (2013.01); *B60Q 1/525* (2013.01); *B60R 1/00* (2013.01); *B60W 30/10* (2013.01); *B60W 50/0097* (2013.01); *G01C 21/365* (2013.01); *G01C 21/3697* (2013.01); *B60Q 2300/32* (2013.01); *B60Q 2300/45* (2013.01); *B60Q 2400/50* (2013.01); *G08G 1/16* (2013.01)

(58) Field of Classification Search
CPC ...... G01C 21/3626; B60R 1/00; B60Q 1/00; B60Q 2400/50
USPC ....... 340/905, 902, 903, 435, 436, 464, 465, 340/425.5, 937, 995.14, 995.17, 995.19; 701/35, 45, 301, 15, 211; 348/113
See application file for complete search history.

(56) References Cited

U.S. PATENT DOCUMENTS

| | | | | |
|---|---|---|---|---|
| 6,733,134 | B2 * | 5/2004 | Bleiner | ........................... 353/13 |
| 7,782,184 | B2 * | 8/2010 | Wittorf et al. | ................ 340/468 |

(Continued)

FOREIGN PATENT DOCUMENTS

| | | |
|---|---|---|
| DE | 102009009472 A1 | 8/2010 |
| EP | 1334871 A2 | 8/2008 |
| JP | 2003112589 A | 4/2003 |

OTHER PUBLICATIONS

European Search Report dated Jun. 15, 2015 in Application No. 15151127.6.

*Primary Examiner* — Toan N Pham
(74) *Attorney, Agent, or Firm* — Artegis Law Group, LLP

(57) ABSTRACT

A roadway projection system integrated into a vehicle is configured to identify a specific driving scenario encountered by a driver of the vehicle, and to then project an image onto a roadway along which the vehicle travels based on that scenario. The image is intended to provide guidance to the driver in negotiating the identified scenario and/or to visualize potential driving actions of the driver for the benefit of others. The image could be, for example, and without limitation, an indicator that the driver should follow to perform a specific driving or navigation action, or a preference that the driver wishes to share with other drivers. In addition, the roadway projection system may detect images projected by other roadway projection systems in other vehicles and to determine mutual preferences shared between drivers. When a shared preference is violated, the roadway projection system may alert the driver of the vehicle.

20 Claims, 24 Drawing Sheets

(51) Int. Cl.
*B60R 1/00* (2006.01)
*B60Q 1/08* (2006.01)
*B60Q 1/50* (2006.01)
*B60Q 1/52* (2006.01)
*G08G 1/16* (2006.01)

(56) References Cited

U.S. PATENT DOCUMENTS

| | | | |
|---|---|---|---|
| 8,260,536 B2 * | 9/2012 | Stefani | B60Q 1/50 701/418 |
| 8,733,939 B2 * | 5/2014 | Othmer | B60Q 1/50 353/13 |
| 2005/0149251 A1 * | 7/2005 | Donath et al. | 701/200 |
| 2010/0002204 A1 * | 1/2010 | Jung et al. | 353/122 |
| 2010/0017111 A1 | 1/2010 | Stefani | |
| 2010/0292886 A1 * | 11/2010 | Szczerba et al. | 701/29 |
| 2011/0052042 A1 * | 3/2011 | Ben Tzvi | 382/154 |
| 2011/0082642 A1 * | 4/2011 | Magnussen | 701/208 |
| 2011/0301813 A1 * | 12/2011 | Sun et al. | 701/41 |
| 2012/0032594 A1 * | 2/2012 | Hagner | 315/82 |
| 2012/0044090 A1 * | 2/2012 | Kahler et al. | 340/905 |
| 2012/0224060 A1 * | 9/2012 | Gurevich | B60R 1/00 348/148 |
| 2013/0080359 A1 * | 3/2013 | Will et al. | 706/12 |
| 2014/0204201 A1 * | 7/2014 | Norman | 348/113 |
| 2014/0236483 A1 * | 8/2014 | Beaurepaire et al. | 701/533 |
| 2015/0039201 A1 * | 2/2015 | Dean | 701/88 |

* cited by examiner

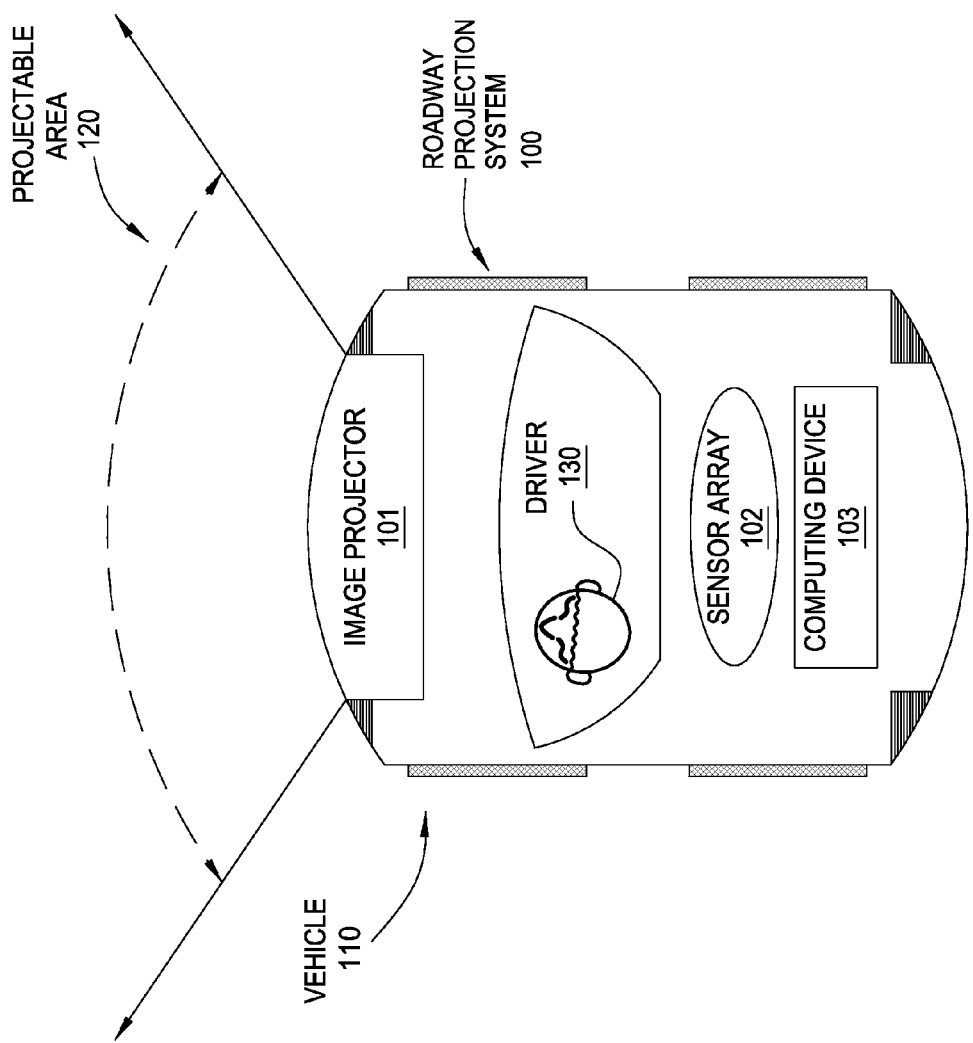

ROADWAY PROJECTION SYSTEM

BACKGROUND

1. Field of the Embodiments of the Invention

Embodiments of the present invention relate generally to driving assistance and, more specifically, to a roadway projection system.

2. Description of the Related Art

A modern vehicle may be equipped with a wide spectrum of different tools that provide information to the driver in order to assist with the act of driving. At one end of the spectrum, almost all vehicles are equipped with a speedometer, a tachometer, a temperature gauge, and other fundamental instruments. The information provided by such instruments may assist the driver of a vehicle with the immediate control of the vehicle by providing feedback that reflects the instantaneous operating condition of that vehicle (i.e., at a very short time frame).

At the other end of the spectrum, many modern vehicles also are equipped with navigation systems that rely on global positioning system (GPS) data to provide navigation information. The information provided by such navigation systems is meant to assist with the high-level act of navigation by indicating a sequence of driving actions that the driver should perform in order to properly navigate from one location to another. Such assistance is relevant at a much longer time frame compared to the time frame within which the instruments mentioned above are used.

The two different types of systems discussed above provide useful information that is relevant at their respective short and long time frames. However, neither system is capable of providing assistance with driving actions that occur at a "medium" time frame falling somewhere between the aforementioned short and long time frames. For example, a speedometer may assist the driver with controlling the instantaneous speed of the vehicle during a turn (in an immediate context), and a navigation system may assist the driver with determining where to make the turn (in a global context), yet neither tool is capable of assisting the driver with the mechanics of performing the turn itself. In general, conventional approaches to assisting a driver with the act of driving typically fall short of providing assistance related to specific driving actions, including turning, merging, traveling in traffic, and so forth.

As the foregoing illustrates, what would be useful is an approach for providing assistance with specific driving actions to a driver of a vehicle.

SUMMARY

One embodiment of the present invention sets forth a system configured to assist a driver of a vehicle with performing driving actions, including a sensor array configured to gather data associated with a roadway on which the vehicle is capable of traveling, an image projector configured to project images onto a projectable area associated with the roadway, and a computing device configured to process the data gathered by the sensor to identify a driving action that the driver is attempting to perform, determine a directive for assisting the driver of the vehicle with performing the driving action, generate an image that shows the directive, and project the image onto the projectable area.

One of the many advantages of the disclosed systems and techniques is that driving assistance may be provided to the driver for performing specific driving actions. Further, that assistance may be provided without requiring the driver to look away from the roadway.

BRIEF DESCRIPTION OF THE SEVERAL VIEWS OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 1A-1C illustrate a roadway projection system configured to implement one or more aspects of various embodiments of the present invention;

DETAILED DESCRIPTION

Figure 1B:
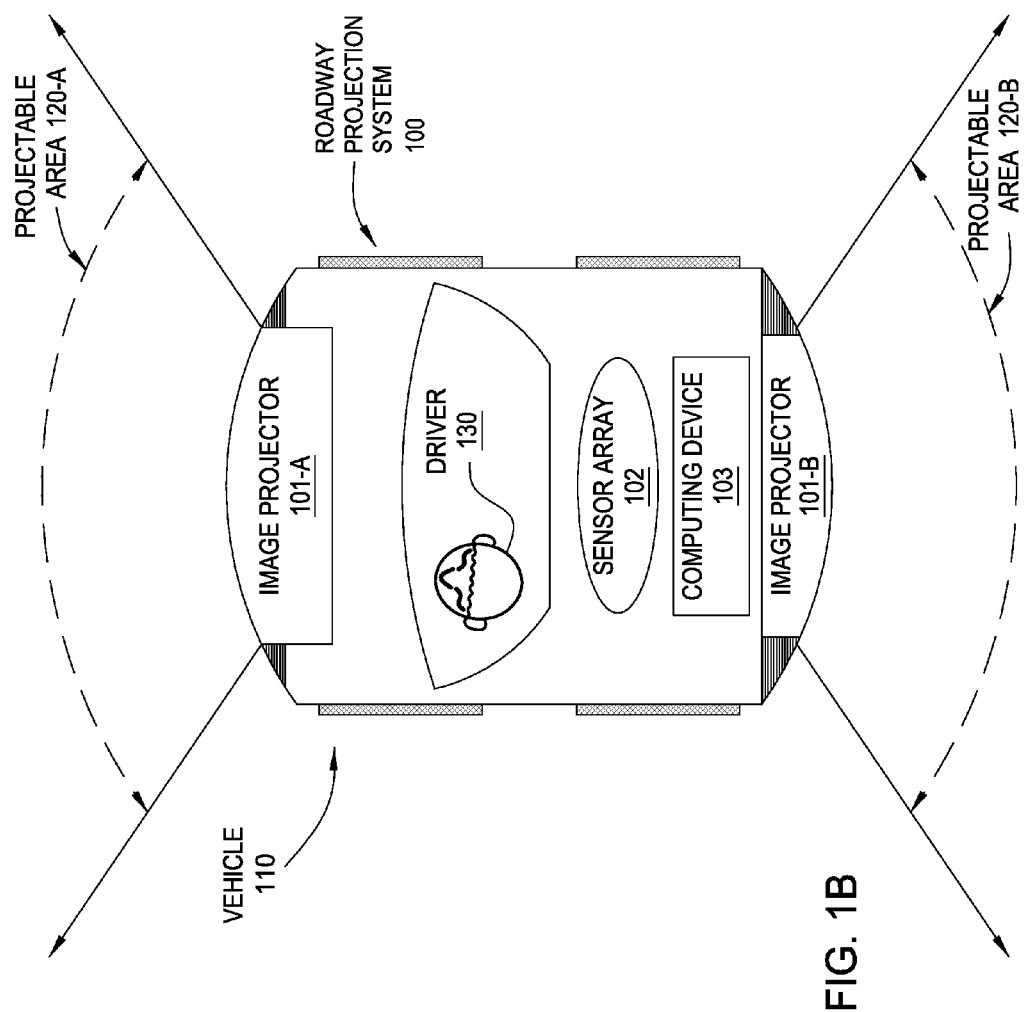

In the following description, numerous specific details are set forth to provide a more thorough understanding of the present invention. However, it will be apparent to one of skill in the art that the present invention may be practiced without one or more of these specific details.

System Overview

FIG. 1A illustrates a roadway projection system 100 configured to implement one or more aspects of various embodiments of the present invention. As shown, roadway projection system 100 is integrated into a vehicle 110 and is configured to project images onto a projectable area 120 for display to a driver 130 of vehicle 110. In operation, projectable area 120 typically includes portions of a roadway on which vehicle 110 travels and/or surfaces residing along that roadway. Roadway projection system 100 projects images onto that roadway and/or surfaces along the roadway to assist driver 130 with driving vehicle 110. Such images include directives for assisting driver 130 in performing specific driving actions, including trajectory guidelines that driver 130 should follow, and warnings that alert driver 130 to potentially dangerous driving conditions, among other possibilities discussed in greater detail below in conjunction with FIGS. 3A-3G. Roadway projection system 100 includes an image projector 101, a sensor array 102, and a computing device 103.

Image projector 101 is an optical projection system configured to emit light onto projectable area 120 to create images within that area. The projected images may include text, arrows, polygons, line drawings, or any other type of image. Image projector 101 may be a laser projection system, a liquid crystal display (LCD) projector, a three-dimensional (3D) projector, a video projector, or any technically feasible system capable of projecting images onto a surface. Image projector 101 is configured to project images that are generated by computing device 101 based on sensor data received from sensor array 102.

Sensor array 102 is an array of different sensors configured to measure various properties associated with the environment that surrounds vehicle 110, including, but not limited to, projectable area 120. Sensor array 102 may include optical sensors, ultrasound sensors, SONAR and/or LIDAR sensors, depth sensors, stereoscopic imaging sensors, topography mapping sensors, and so forth. Sensor array 102 is configured to record sensor data in a 360° panorama surrounding vehicle 110 and transmit that data to computing device 103 for processing.

Computing device 103 is a computer system that is configured to manage the overall operation of roadway projection system 100. Computing device 103 may be any technically feasible type of computer system, although an exemplary computing device is described in greater detail below in conjunction with FIG. 10. In operation, computing device 103 is configured to receive sensor data from sensor array 102 and to process that data to identify a current driving action with which driver 130 may need assistance. In the context of this disclosure, a "driving action" may include turning, merging, driving through traffic, caravanning with other vehicles, and other actions typically associated with driving vehicles. Computing device 103 may also be configured to process the sensor data to identify potentially dangerous driving conditions associated with a current driving action.

Once the current driving action has been identified, computing device 103 determines a particular directive that may assist driver 130 with performing the current driving action. For example, and without limitation, if computing device 103 identifies that driver 130 is performing a right-hand turn, computing device 103 could compute the optimal trajectory through the turn and generate a trajectory directive that delineates that optimal trajectory. Computing device 103 may then cause image projector 101 to project a line onto projectable area 120 that reflects the optimal trajectory, and driver 130 may then cause vehicle 110 to follow that line in performing the right-hand turn. This particular example is discussed in greater detail below in conjunction with FIGS. 3B-3C.

Computing device 103 may process the sensor data to identify the current driving action using image processing, object recognition algorithms, computer vision techniques, neural networks, and so forth. Computing device 103 may also classify the current driving action within a database of driving actions, and then select a directive that corresponds to the current driving action. Persons familiar with driving vehicles will understand that a wide variety of driving actions may be performed while driving. Computing device 103 may be configured to identify some or all such driving actions and select an appropriate directive that may assist driver 130.

In order to project a directive onto projectable area 120, computing device 103 first identifies that projectable area from within the environment that surrounds vehicle 110 based on sensor data. In doing so, computing device 103 processes the sensor data and identifies non-projectable surfaces proximate to vehicle 110, including humans and highly reflective surfaces, among other surfaces onto which images should not be projected. Computing device 103 then determines projectable area 120 as the portion of the surrounding environment that excludes those non-projectable surfaces. Computing device 103 may also determine projectable area 120 based on a range parameter associated with image projector 101. Computing device 103 then processes sensor data associated with projectable area 120 to identify terrain variations that could potentially distort images projected thereto.

Computing device 103 then generates an image for projection onto projectable area 120 that accounts for the identified terrain variations and avoids non-projectable surfaces. The generated image represents a directive for assisting driver 130 with the current driving action. Then, computing device 103 causes image projector 101 to project the image onto projectable area 120. Driver 130 may view the projected image and perform a driving action in response to the directive provided by that image. Again, various examples of directives that may provide driving assistance are described in greater detail below in conjunction with FIGS. 3A-3G as well as FIGS. 7A-8D. Once the image is projected, sensor array 102 may capture data that reflects the projected image and feed that data back into computing device 103. Computing device 103 may then modulate the image, as needed, to correct distortions, re-position the image, etc. In this fashion, roadway projection system 100 may operate as a closed-loop system.

Although FIG. 1A illustrates a specific configuration of roadway projection system 100, persons skilled in the art will recognize that the general functionality described thus far may also be implemented by other configurations of roadway projection system 100. In particular, roadway projection system 100 may also be configured to project images onto other projectable areas within the environment surrounding vehicle 110, as described in greater detail below in conjunction with FIGS. 1B-1C.

FIG. 1B illustrates roadway projection system 100 of FIG. 1A configured to project images both ahead of, and behind, vehicle 100, according to various embodiments of the present invention. As shown, roadway projection system includes an image projector 101-A that is configured to project images onto projectable area 120-A, as well as an image projector 101-B that is configured to project images onto projectable area 120-B. Image projectors 101-A and 101-B may operate in conjunction with sensor array 102 and computing device 103 in similar fashion as image projector 101 described above in conjunction with FIG. 1A. With the configuration described herein, roadway projection system 100 may project images behind vehicle 110 that may be viewable to drivers in vehicles other than vehicle 110. Roadway projection system 100 may also be configured to project images in a 360° panorama surrounding vehicle 110, as described in greater detail below in conjunction with FIG. 1C.

Figure 1C:
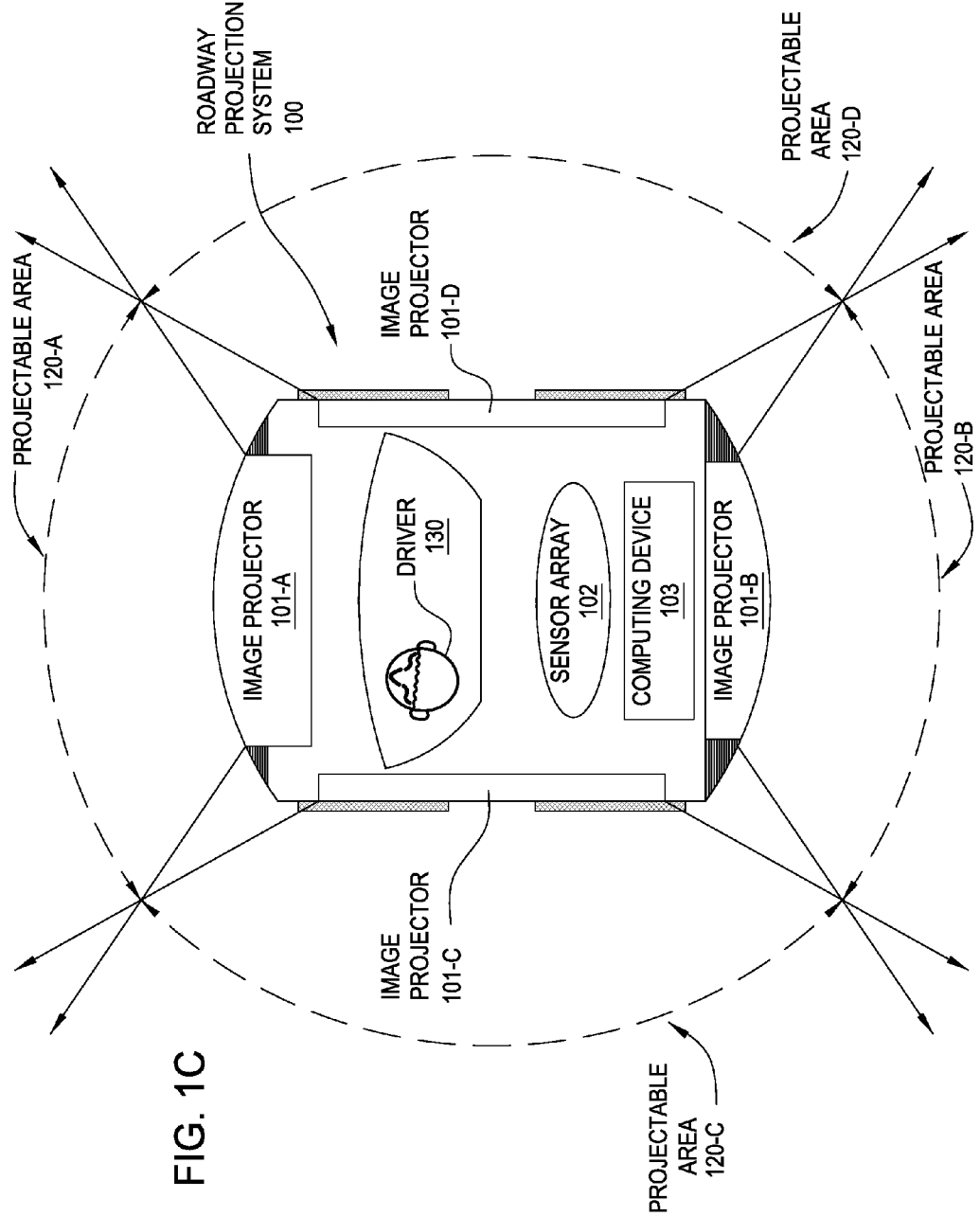

FIG. 1C illustrates roadway projection system 100 of FIG. 1A configured to project images in a 360° panorama that surrounds vehicle 100, according to various embodiments of the present invention. As shown, roadway projection system includes image projectors 101-A and 101-B that are configured to project images onto projectable areas 120-A and 120-B, as also shown in FIG. 1B. In addition, roadway projection system 100 also includes image projectors 101-C and 101-D that are configured to project images onto projectable areas 120-C and 120-D, respectively, that reside on either side of vehicle 110. Image projectors 101-A through 101-D generally operate in conjunction with sensor array 102 and computing device 103 in similar fashion as image projector 101 described above in conjunction with FIG. 1A. With the configuration described herein, roadway projection system 100 may project images within an area that substantially surrounds vehicle 110.

Figure 2A:
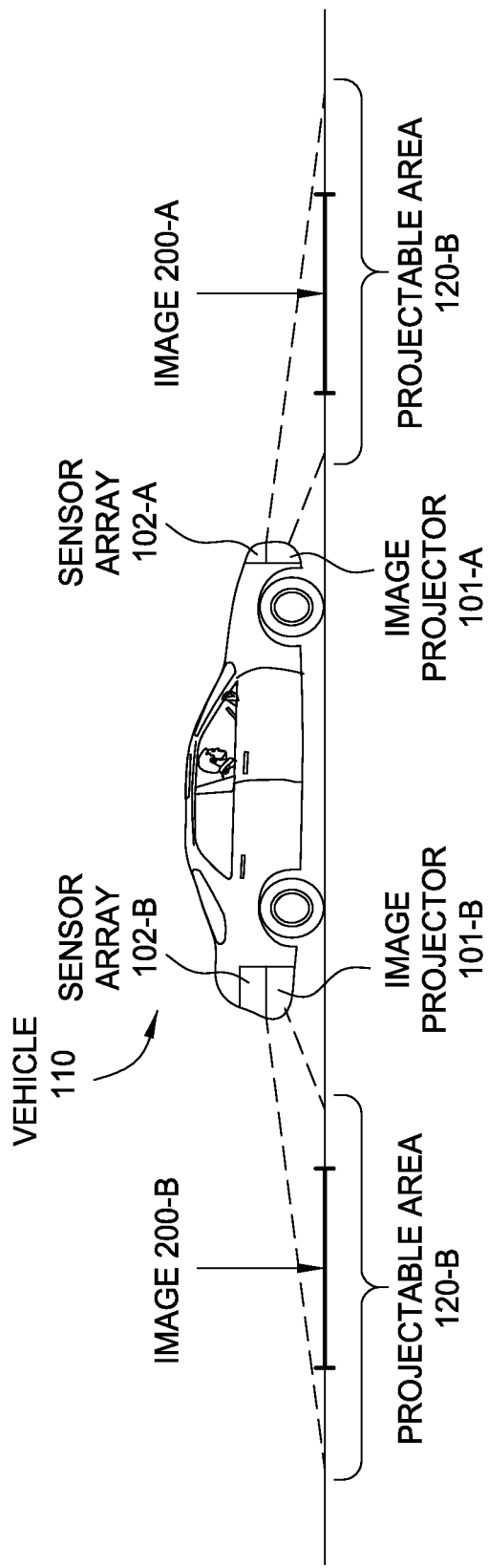
FIGS. 2A-2B illustrate the roadway projection system of FIGS. 1A-1C projecting an image onto a roadway, according to various embodiments of the present invention.
Figure 2B:
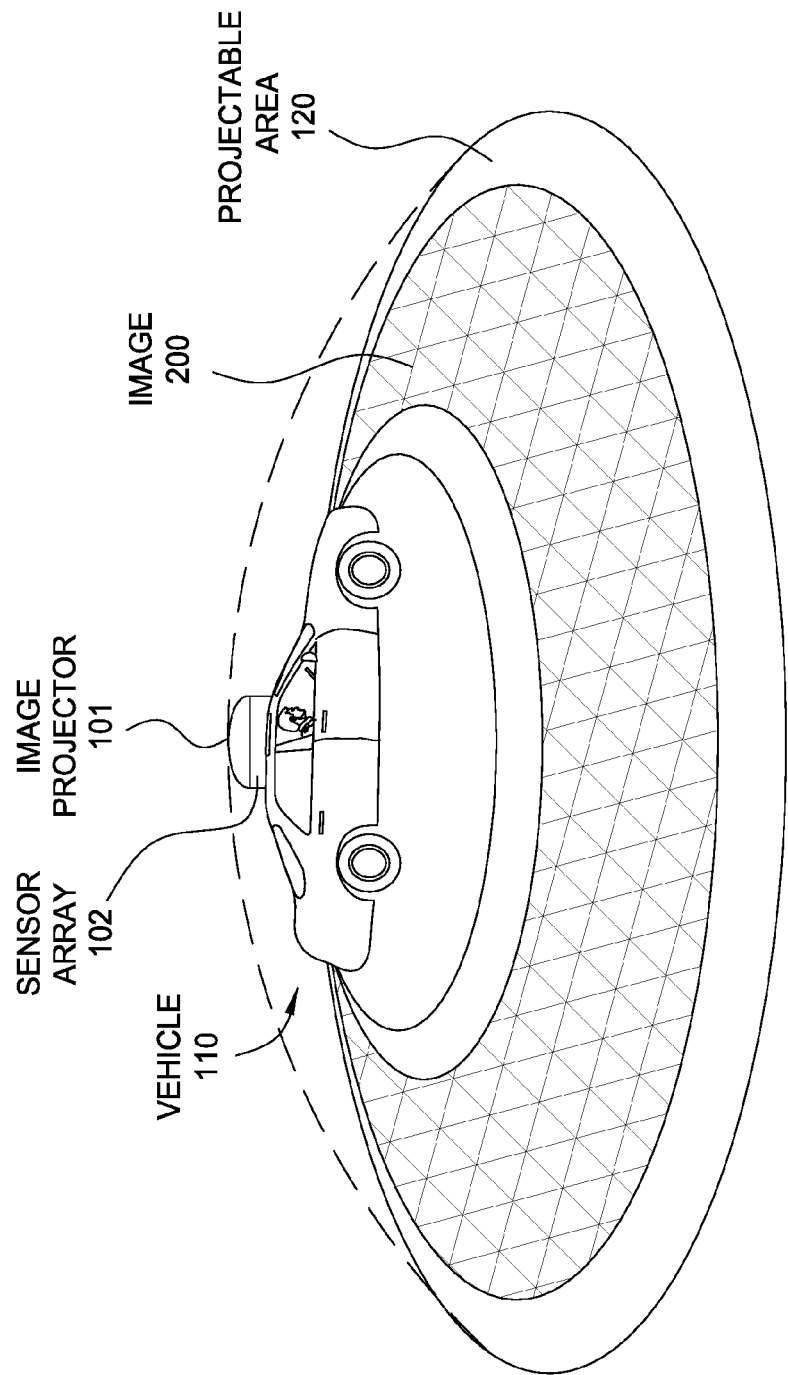

Referring generally to FIGS. 1A-1C, various components of roadway projection system 100 may be integrated into vehicle 110 in a variety of different locations in order to implement the functionality described thus far. FIGS. 2A-2B illustrate exemplary integrations of roadway projection system 100 into vehicle 110.

FIG. 2A illustrates an integration of roadway projection system 100 where image projectors 101 and sensor array 102 are included within the front and rear of vehicle 110, according to various embodiments of the present invention. As shown, similar to FIG. 1B, image projector 101-A is integrated into a front bumper of vehicle 110 and configured to project an image 200-A within projectable area 120-A. Sensor array 102-A is similarly integrated and configured to measure properties of a portion of the environment that resides ahead of vehicle 110, including image 200-A. As also shown, image projector 102-B is integrated into a rear bumper of vehicle 110 and configured to project an image 200-B within projectable area 120-B. Sensor array 102-A is similarly integrated and configured to measure properties of a portion of the environment that resides behind vehicle 110, including image 200-B. Roadway projection system 100 may also be integrated into vehicle 110 to provide 360° projection capabilities, as described in greater detail below in conjunction with FIG. 2B.

FIG. 2B illustrates an integration of roadway projection system 100 where image projector 101 and sensor array 102 are positioned on top of vehicle 110, according to various embodiments of the present invention. As shown, image projector 101 is configured to project an image 200 onto projectable area 120 that substantially surrounds vehicle 110 in a 360° panorama. Sensor array 102 is similarly capable of measuring properties of that 360° panorama, including image 200.

Referring generally to FIGS. 1A-2B, persons skilled in the art will recognize that the different configurations and integrations discussed in conjunction with those figures are provided for exemplary purposes only. Persons skilled in the art will further understand that any arrangement of components that allows roadway projection system 100 to both project images and record sensor data within some or all of a 360° panorama surrounding vehicle 110 falls within the scope of the present invention. The images projected by roadway projection system 100 may assist driver 130 of vehicle 110 in a wide variety of different driving scenarios, some (but not all) of which are described, by way of example, below in conjunction with FIGS. 3A-3G.

Projecting Images onto a Roadway

Figure 3A:
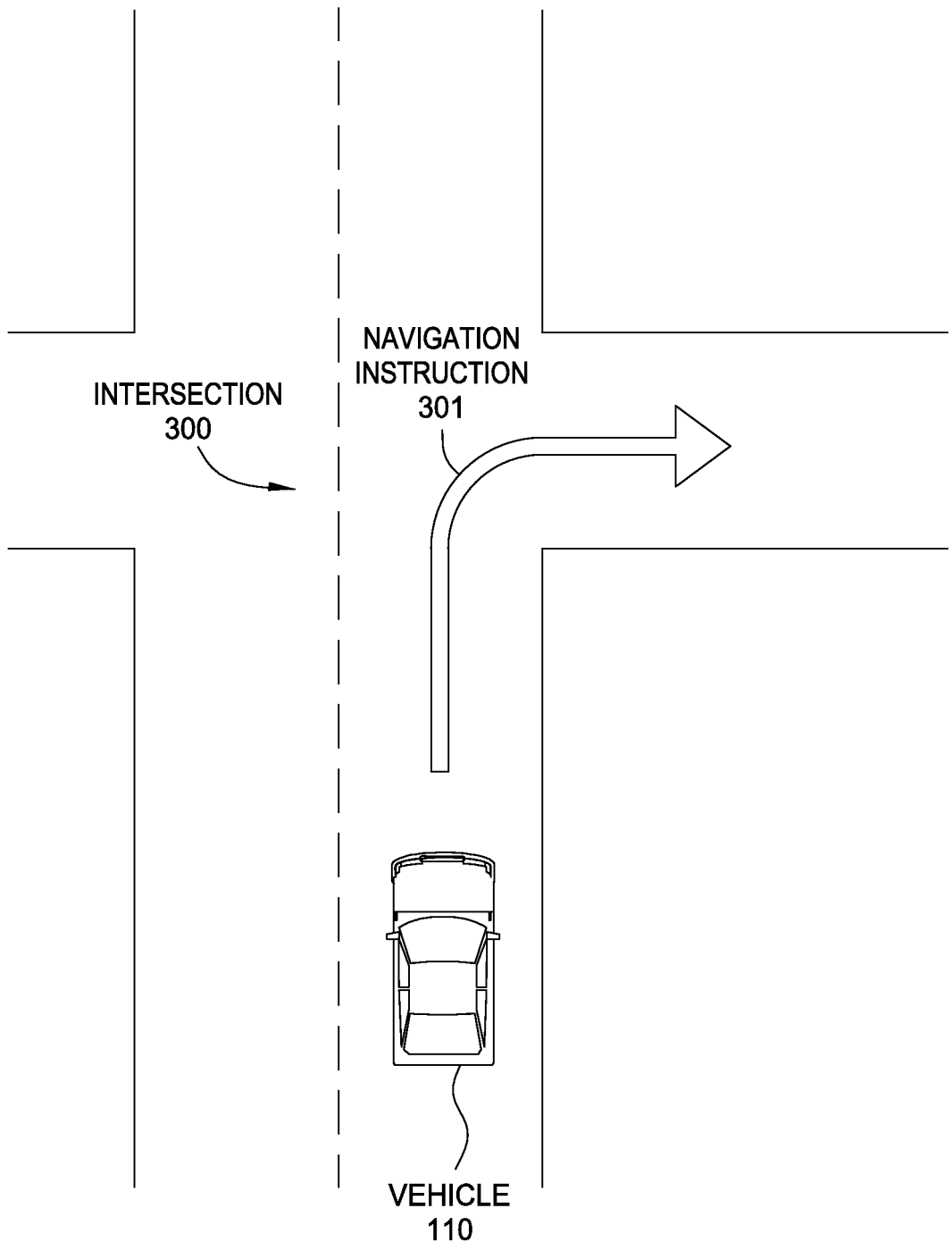
FIGS. 3A-3G illustrate exemplary driving scenarios where the roadway projection system of FIGS. 1A-2B projects images onto a roadway to assist the driver of a vehicle with specific driving actions, according to various embodiments of the present invention.

FIG. 3A illustrates an exemplary driving scenario where roadway projection system 100 provides navigation information to driver 110, according to various embodiments of the present invention. As shown, vehicle 110 approaches an intersection 300. Roadway projection system 100 projects a navigation instruction 301 onto intersection 300. Navigation instruction 301 is shown as an arrow that directs driver 110 to turn right. In operation, computing device 103 determines that the current driving action corresponds to a right-hand turn, and then generates navigation instruction 301 to assist with that right hand turn.

Roadway projection system 100 may provide the functionality described above as an extension to an existing navigation system. For example, and without limitation, a navigation system could provide a driving instruction to roadway projection system 100, and roadway projection system 100 could then interpret that instruction and generate an image that represents the instruction (e.g., navigation instruction 301). Roadway projection system 100 may also be configured to assist driver 110 with the physical mechanics associated with performing a turn, as described in greater detail below in conjunction with FIG. 3B.

Figure 3B:
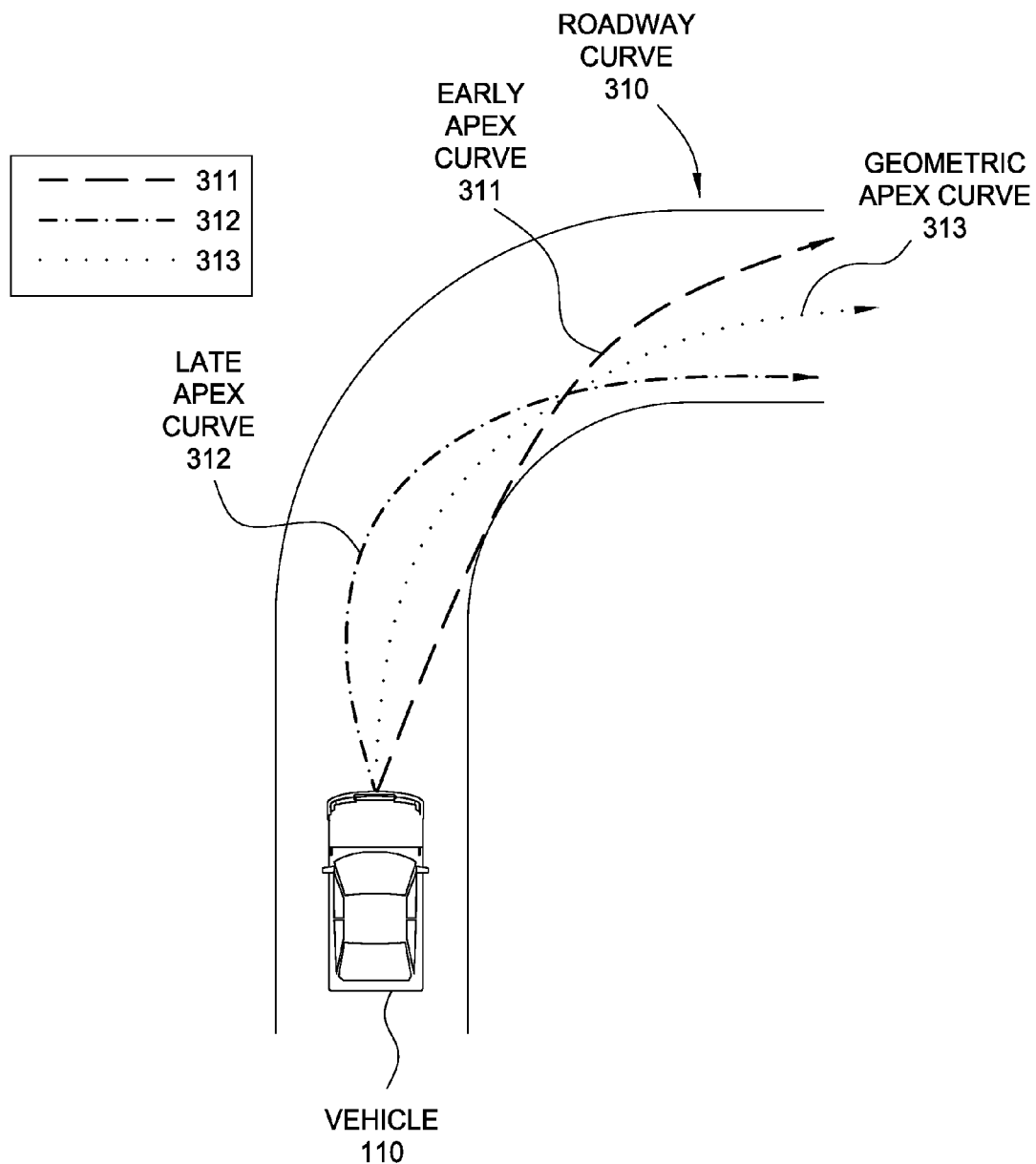

FIG. 3B illustrates an exemplary driving scenario where roadway projection system 100 provides real-time trajectory guidance for assisting driver 110 in performing a turn, according to various embodiments of the present invention. As shown, vehicle 110 approaches roadway curve 310. Vehicle 110 could potentially follow roadway curve 310 along a variety of different trajectories, including an early apex curve 311, a late apex curve 312, and a geometric apex curve 313. Those familiar with automobile racing will recognize that geometric apex curve 313 represents the "ideal" trajectory through roadway curve 310 that minimizes momentum loss and maximizes speed of vehicle 110, while early and late apex curves 311 and 312 represent less than ideal trajectories. Roadway projection system 100 is configured to process sensor data to analyze roadway curve 310 and plot geometric apex curve 313. In doing so, roadway projection system 100 may also retrieve GPS data, cartographic data, and other information that may reflect the precise geometry of roadway curve 310.

Roadway projection system 100 then projects geometric apex curve 313 onto roadway curve 310. Roadway projection system 100 may also provide supplementary information to driver 130, including a speed at which to enter geometric apex curve 313, a gear that vehicle 100 should be using (when vehicle 100 includes a manually-operated transmission), braking and/or acceleration points along geometric apex curve 313, a maximum suggested speed through geometric apex curve 313, and speed at which to exit geometric apex curve 313, among other possibilities. When implemented in a racing vehicle, roadway projection system 100 may also project trajectories associated with previous laps of vehicle 100 or other racing vehicles, as well as previous lap times, among other racing-related information. Roadway projection system 100 may also project the current trajectory of vehicle 100 onto roadway curve 310 along with geometric apex curve 313, as described below in conjunction with FIG. 3C.

Figure 3C:
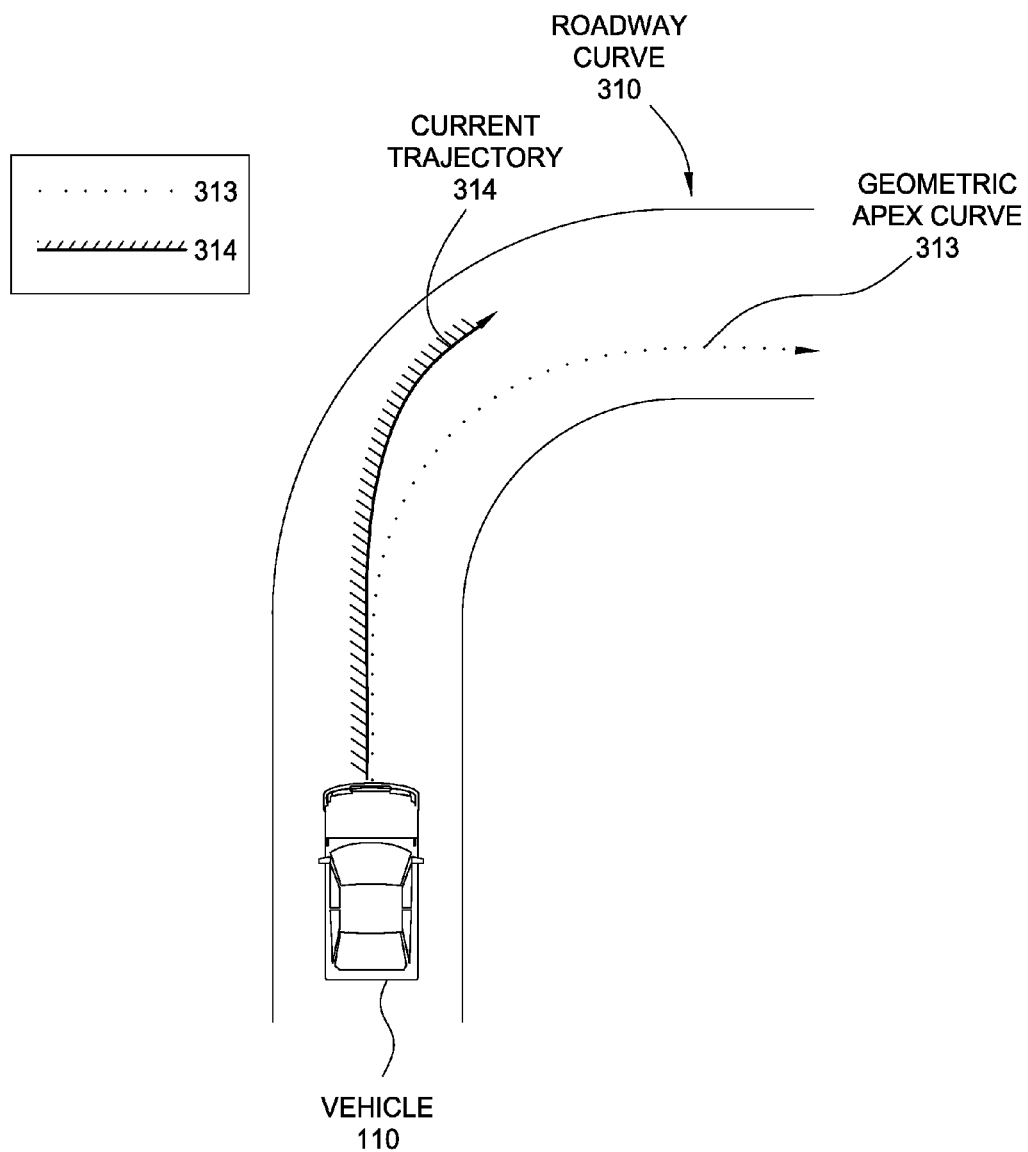

FIG. 3C illustrates a current trajectory 314 that roadway projection system 100 may project onto roadway 310 (along with geometric apex curve 313), according to various embodiments of the present invention. Roadway projection system 100 is configured to extrapolate the current trajectory of vehicle 100 and to project current trajectory 314 onto roadway curve 310. Driver 130 may view current trajectory 314 and then correct that trajectory to more closely align with geometric apex curve 313. With this approach, roadway projection system 100 provides feedback to driver 130 that may inform driver 130 with regard to the current driving action (i.e., performing a right-hand turn along geometric apex curve 313).

Referring generally to FIGS. 3A-3C, roadway projection system 100 may project any of the images discussed thus far in response to detecting implicit behaviors of driver 130. For example, and without limitation, roadway projection system 100 could detect a direction along which driver 130 is focused and then generate an image to reflect that direction of focus. The projected image could represent a course driver 130 intends to follow. In FIGS. 3A-3C, roadway projection system 100 could identify that driver 130 is looking towards the right, and then generate an image to indicate that driver 130 intends to turn right. The image could be an arrow, such as that shown in FIG. 3A, a line such as that shown in FIG. 3C, an animation, and so forth. Persons skilled in the art will recognize that roadway projection system 100 may be configured to detect a wide variety of behaviors associated with driver 130 and then project images in response to those behaviors.

Roadway projection system 100 may include various sensors internal to vehicle 110 and configured to gather data associated with driver 130. For example, and without limitation, roadway projection system 100 could include eye-gaze sensors as well as head position sensors configured to determine a direction that driver 130 is looking Roadway projection system 100 would process data captured by those sensors and then project an image that could reflect an area of focus associated with driver 130. With this exemplary operation, such an image could also indicate areas upon which driver 130 is not focused, thereby indicating an area around vehicle 110 that driver 130 may not be visually aware of. Generally, roadway projection system 100 may generate and project images in response to a wide variety of different sources of data, including data associated with driver 130.

Roadway projection system 100 is also configured to identify driving actions, as well as potentially dangerous driving conditions, that may occur when driver 130 navigates vehicle 110 through traffic, as described below in conjunction with FIGS. 3D-3F.

Figure 3D:
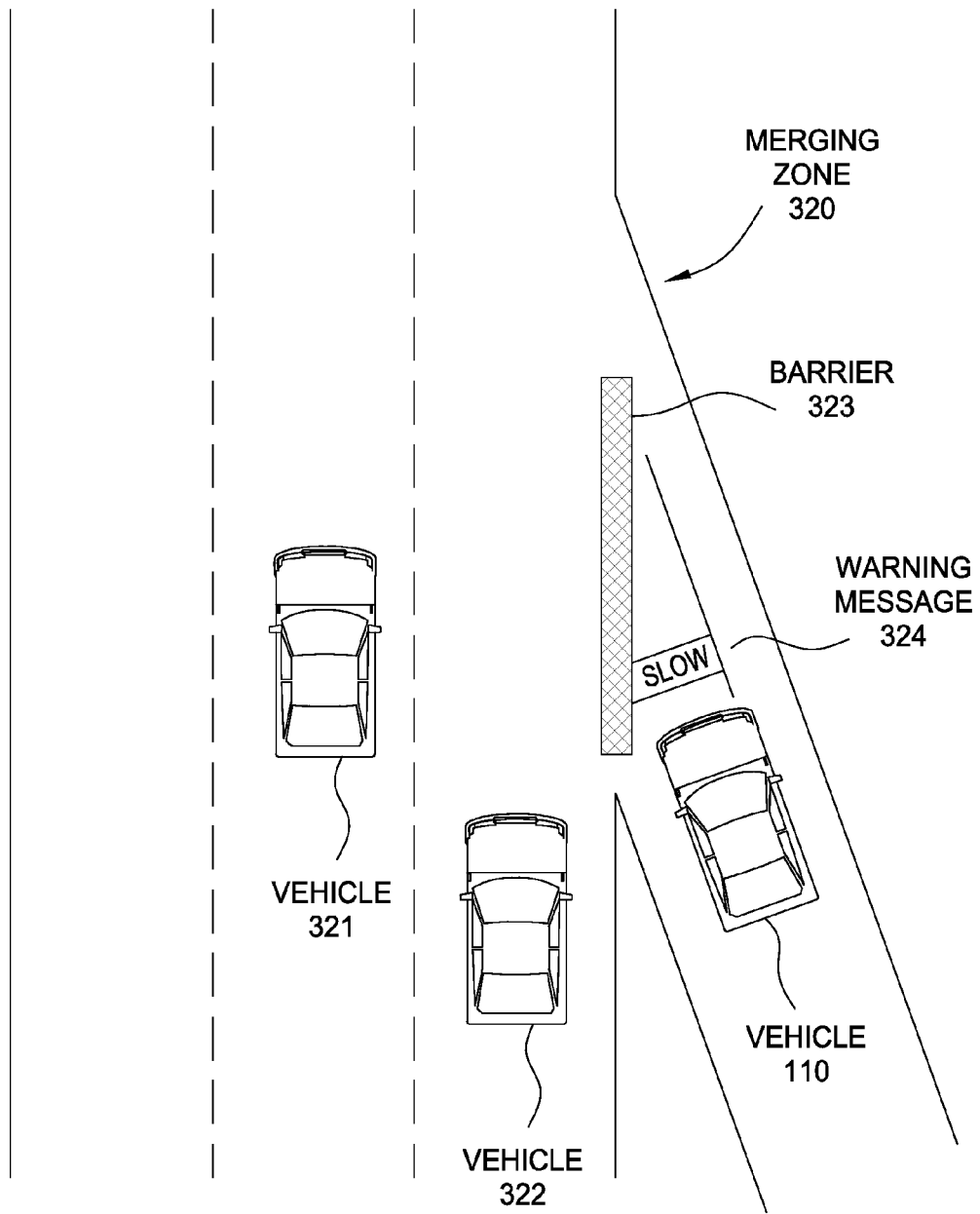

FIG. 3D illustrates an exemplary driving scenario where vehicle 110 approaches a merging zone 320, according to various embodiments of the present invention. As shown, vehicles 321 and 322 also approach merging zone 320. Roadway projection system 100 is configured to identify merging zone 320 determine that driver 130 is currently attempting to merge. Roadway projection system 100 may then determine that vehicle 110 cannot safely merge given the current state of traffic. In particular, roadway projection system 100 may identify that vehicle 110 cannot merge due to the presence of vehicle 322. Roadway projection system 100 generally relies on sensor data gathered by sensor array 102 when identifying the current driving action (merging, in this case), although in the scenario discussed herein roadway projection system 100 may also rely on real-time traffic data, external traffic cameras, and any other sources of information that relate to the current state of traffic.

Roadway projection system 100 then generates directives that may assist driver 130 with merging. As is shown, roadway projection system 100 projects a barrier 323 that indicates to driver 130 that merging cannot presently occur. In conjunction with barrier 323, roadway projection system 100 may also project a warning message 324 indicating that driver 130 should slow vehicle 100. Roadway projection system 100 may also display a speed at which merging can safely occur, braking directives, and other information that may allow driver 130 to safely merge vehicle 110 with traffic along merging zone 320. Roadway projection system 100 may also project warning messages for the benefit of drivers of other vehicles, as described in greater detail below in conjunction with FIG. 3E.

Figure 3E:
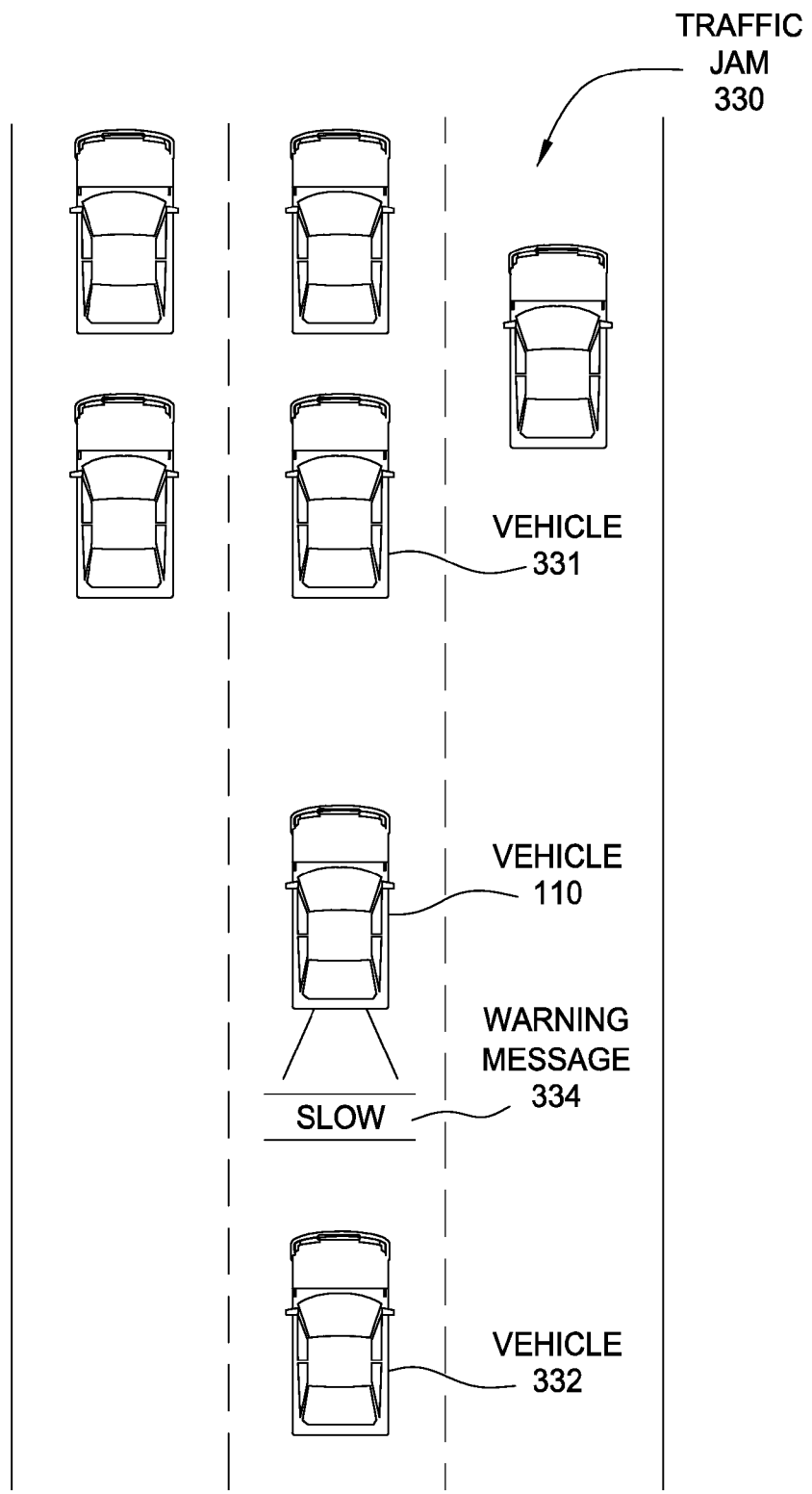

FIG. 3E illustrates an exemplary driving scenario where vehicle 110 approaches a traffic jam 330 that includes a vehicle 331, according to various embodiments of the present invention. As shown, vehicle 110 approaches vehicle 331 within traffic jam 330, and a vehicle 332 follows vehicle 110 closely behind. Roadway projection system 100 is configured to identify traffic jam 330 and determine that driver 130 may need to perform a braking action in advance of traffic jam 330 to avoid a collision with vehicle 331. To indicate this potential braking to the driver of vehicle 332, roadway projection system 100 projects warning message 334 behind vehicle 110. In response to warning message 334, the driver of vehicle 332 may similarly perform a braking action and thereby avoid a collision with vehicle 110 when vehicle 110 performs the aforementioned braking action. With this approach, roadway projection system 100 is configured to assist driver 130 with negotiating potentially dangerous driving conditions by automatically warning other drivers of those conditions.

In one embodiment of the present invention, vehicle 331 includes a roadway projection system that is configured to communicate with roadway projection system 100 within vehicle 110. The roadway projection system within vehicle 331 may communicate with roadway projection system 100 and indicate that vehicle 331 has slowed or stopped due to traffic jam 330. With this approach, roadway projection system 100 may acquire additional information that relates to the current state of traffic. In similar fashion, roadway projection system 100 may communicate with another roadway projection system within vehicle 332 in order to provide traffic-related information to that system.

In addition to warning message 334, roadway projection system 100 may also project other images meant to provide information to drivers of vehicles traveling near vehicle 110. Such directives may indicate a preference of driver 130, as described in greater detail below in conjunction with FIG. 3F.

Figure 3F:
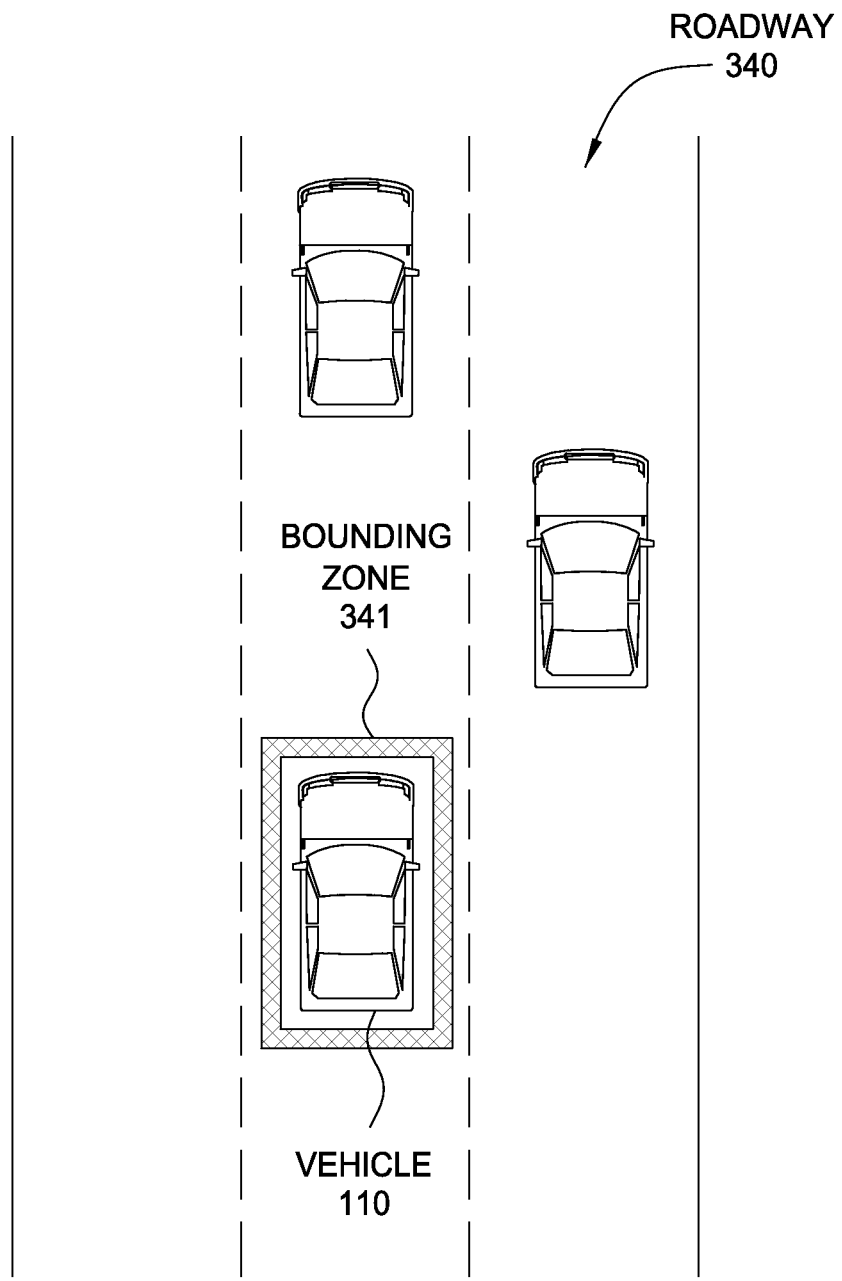

FIG. 3F illustrates an exemplary driving scenario where vehicle 110 travels along a roadway 340 with other vehicles, according to various embodiments of the present invention. As shown, roadway projection system 100 projects a bounding zone 341 that surrounds vehicle 110. Bounding zone 341 represents a protected territory around vehicle 110 that driver 130 wishes to prevent other vehicles from entering. More specifically, bounding zone 341 represents a minimum separation between vehicles that driver 130 prefers to maintain. Driver 130 may configure roadway projection system 100 to establish any sized bounding zone of any shape within projectable area 120 depending on the preferences of driver 130. Driver 130 may also configure bounding zone 324 to have any dimensions and/or proportions.

For example, and without limitation, driver 130 could configure roadway projection system 100 to generate a bounding zone that extends far behind vehicle 110 and extends a comparatively short distance ahead of vehicle 110. Although bounding zone 341 is shown as a rectangular polygon, roadway projection system 100 may generate bounding zones having any shape, including, e.g., elliptical bounding zones, circular bounding zones, customized bounding zones having shapes provided by driver 130, etc. Generally, bounding zone 341 represents a preference of driver 130 that driver 130 wishes to make public to other drivers traveling along roadway 340.

In one embodiment, roadway projection system 100 may generate bounding zone 341 with a shape and size that reflects the current state of traffic in which vehicle 100 travels. For example, and without limitation, if roadway projection system 100 identifies vehicles exhibiting unpredictable driving behavior (including aggressive driving behavior) then roadway projection system 100 could automatically expand bounding zone 341. Likewise, if roadway projection system 100 determines that vehicle 100 has come to a complete stop due to heavy traffic, roadway projection system 100 could contract bounding zone 341. In general, roadway projection system 100 may dynamically determine the shape and size of bounding zone 341 based on operating conditions associated with vehicle 110, conditions of traffic within which vehicle 110 travels, and/or preferences configured by driver 130.

Roadway projection system 100 may also generate bounding zone 341 when operating as part of a vehicle-to-vehicle driving system that includes multiple vehicles, where each such vehicle includes a roadway projection system. A given vehicle that includes a roadway projection system could be a manually-operated vehicle or an autonomous vehicle. When operating as part of the vehicle-to-vehicle system, roadway projection system 100 is configured to detect bounding zones and other images projected by roadway projection systems in neighboring vehicles. Roadway projection system 100 may then respond depending on the type of image detected, by notifying the driver of the vehicle or automatically initiating a driving action (in the case of an autonomous vehicle), among other examples, and without limitation. The vehicle-to-vehicle system described herein is also described in greater detail below in conjunction with FIGS. 7A-9.

Roadway projection system 100 may be configured to indicate to driver 130 signs and other surfaces residing alongside the roadway traveled by vehicle 110, as described in greater detail below in conjunction with FIG. 3G.

Figure 3G:
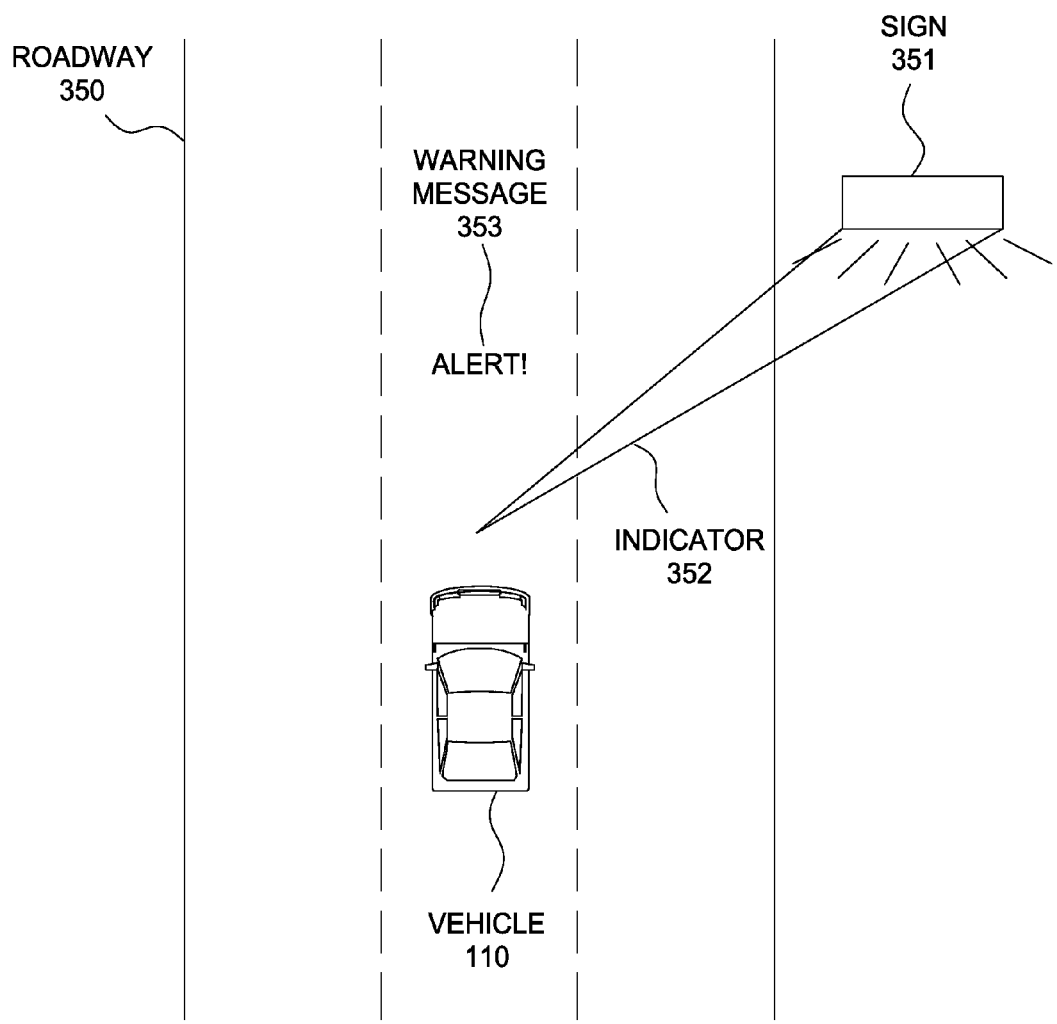

FIG. 3G illustrates an exemplary driving scenario where vehicle 110 travels along a roadway 350, adjacent to which a sign 351 is positioned, according to various embodiments of the present invention. Sign 351 may be an exit sign, a maximum speed sign, an informational sign, or another type of sign that may be relevant to driver 130. Roadway projection system 100 is configured to process sensor data received from sensor array 102 and identify that sign 351 may be relevant to driver 130 based on a current driving action performed by driver 130. For example, and without limitation, if driver 130 is currently exceeding the maximum posted speed, roadway projection system 130 could determine that sign 351 represents a maximum speed sign, and then draw the attention of driver 110 to sign 351. In doing so, roadway projection system 100 may project an indicator 352 onto roadway 350, or directly illuminate sign 351 (e.g. by emitting light towards sign 351). Indicator 352 could be a static shape or an animation that draws the attention of driver 130 towards sign 351. In addition roadway projection system 100 may also display a warning message 353 indicating that driver 110 should take note of sign 351.

In another example, and without limitation, roadway projection system 100 could determine that driver 130 is currently following a set of driving instructions generated by a navigation system, and then determine that sign 351 provides information that may be associated with that set of driving directions. Sign 351 could indicate a particular exit that should be followed in keeping with those directions, or a detour sign indicating that the current route is closed ahead, among other possibilities. In yet another example, and without limitation, roadway projection system 100 could determine that a fuel level associated with vehicle 100 is low, and then determine that sign 351 indicates a nearby gas station. Roadway projection system 100 would then project indicator 352 to inform driver 130 that additional gas may be acquired nearby.

Generally, roadway projection system 100 is configured to identify a wide variety of objects that may be relevant to driver 130 and to then generate indicators that draw the attention of driver 130 towards those objects. The set of identifiable objects may be configurable based on the preferences of driver 130 or the current operating state of vehicle 100. The particular type of indicator may also vary based on the type of identified object or based on the potential relevance of the identified object to driver 130. For example, and without limitation, an indicator generated by roadway projection system 100 may be a static shape or a dynamic animation, depending on context.

Roadway projection system 100 is also configured to process sensor data received from sensor array 102 to identify variations in projectable area 120 that could distort images projected thereto. In response, roadway projection system 100 may adjust generated images, prior to projection, to account for those variations, as described in greater detail below in conjunction with FIG. 4.

Figure 4:
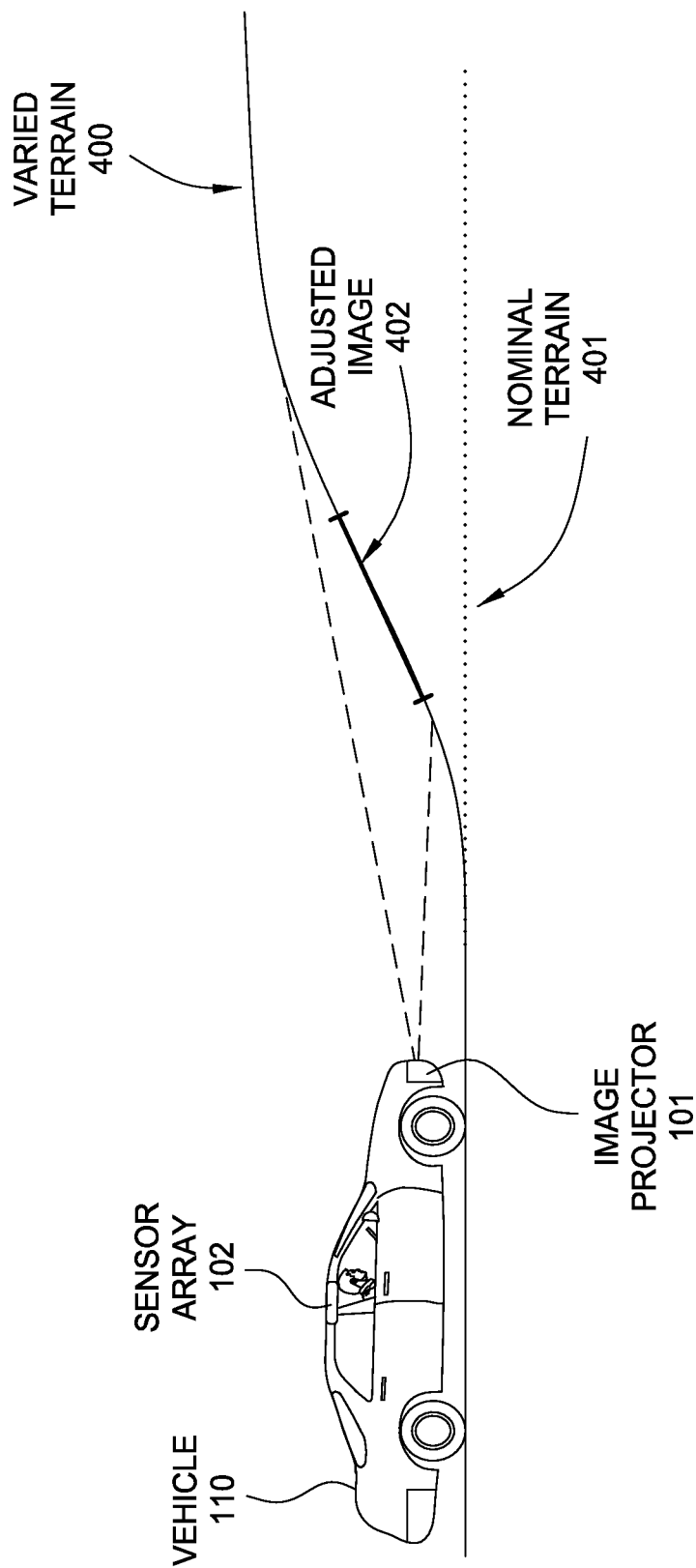
FIG. 4 illustrates an exemplary driving scenario where the roadway projection system of FIGS. 1A-2B projects an adjusted image onto a roadway that accounts for terrain variations, according to various embodiments of the present invention.

FIG. 4 illustrates an exemplary driving scenario where vehicle 110 approaches varied terrain 400, according to various embodiments of the present invention. Varied terrain 400 represents a deviation from a typical flat roadway (shown as nominal terrain 401) across which vehicle 110 may travel. When traveling across nominal (flat) terrain 401, roadway projection system 100 need only account for the angle of nominal terrain relative to image projector 101. That angle may be relatively consistent across broad stretches of nominal terrain.

However, vehicle 110 may also drive over bumps, dips, hills, and other types of terrain variations that could distort images projected thereto. In order to correct for these potential distortions, roadway projection system 100 is configured to gather topographic information via sensor array 102 and to establish depth values associated with different portions of terrain ahead of vehicle 110. Computing device 103 within roadway projection system 100 may then adjust generated images, prior to projection, to account for those variations. As is shown, roadway projection system 100 projects an adjusted image 402 onto varied terrain 400 that has been adjusted to account for differences between nominal terrain 401 and varied terrain 400. Adjusted image 402 may thereby appear undistorted to driver 130. As a general matter, roadway projection system 100 may account for any factors that could alter a projected image, including topographic variations such as those mentioned above, as well as surface variations due to reflectivity differences, color differences, ambient lighting conditions, among other possibilities, and without limitation.

With this approach, vehicle 110 may travel across a wide variety of different types of terrain, yet roadway projection system 100 may project images, including the directives and message discussed above, with relative consistency. Roadway projection system 100 is also configured to identify objects and surfaces proximate to vehicle 110 onto which images and directives should not be projected, as described below in conjunction with FIG. 5A.

Figure 5A:
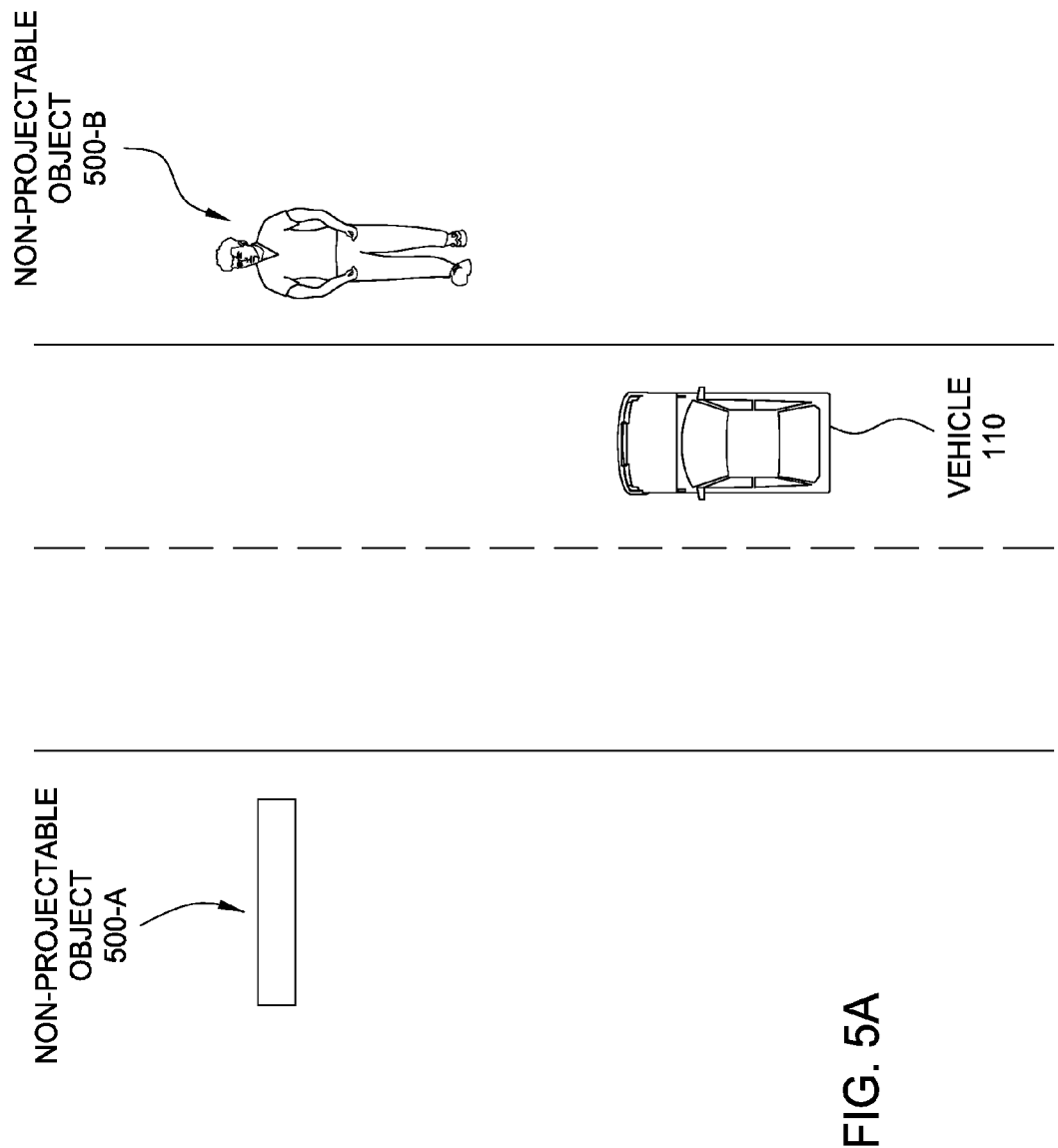
FIGS. 5A-5B illustrate an exemplary driving scenario where the roadway projection system of FIGS. 1A-2B selectively projects images onto certain portions of a roadway, according to various embodiments of the present invention.

FIG. 5A illustrates an exemplary driving scenario where vehicle 110 travels near a non-projectable object 500-A and a non-projectable object 500-B, according to various embodiments of the present invention. Non-projectable object 500-A may represent a specific type of surface onto which projecting images could be dangerous, including retroreflective surfaces, mirrors, and other surfaces that could reflect light emitted by image projector 101 back towards driver 130. Non-projectable object 500-B may be similar to non-projectable object 500-A, but generally represents a specific type of object onto which images should not be projected (i.e., due to laws, respect for pedestrians, etc.), including humans, animals, houses, other cars, and so forth. Roadway projection system 100 is configured to identify non-projectable objects 500 and to exclude those objects from projectable area 120, as described in greater detail below in conjunction with FIG. 5B.

Figure 5B:
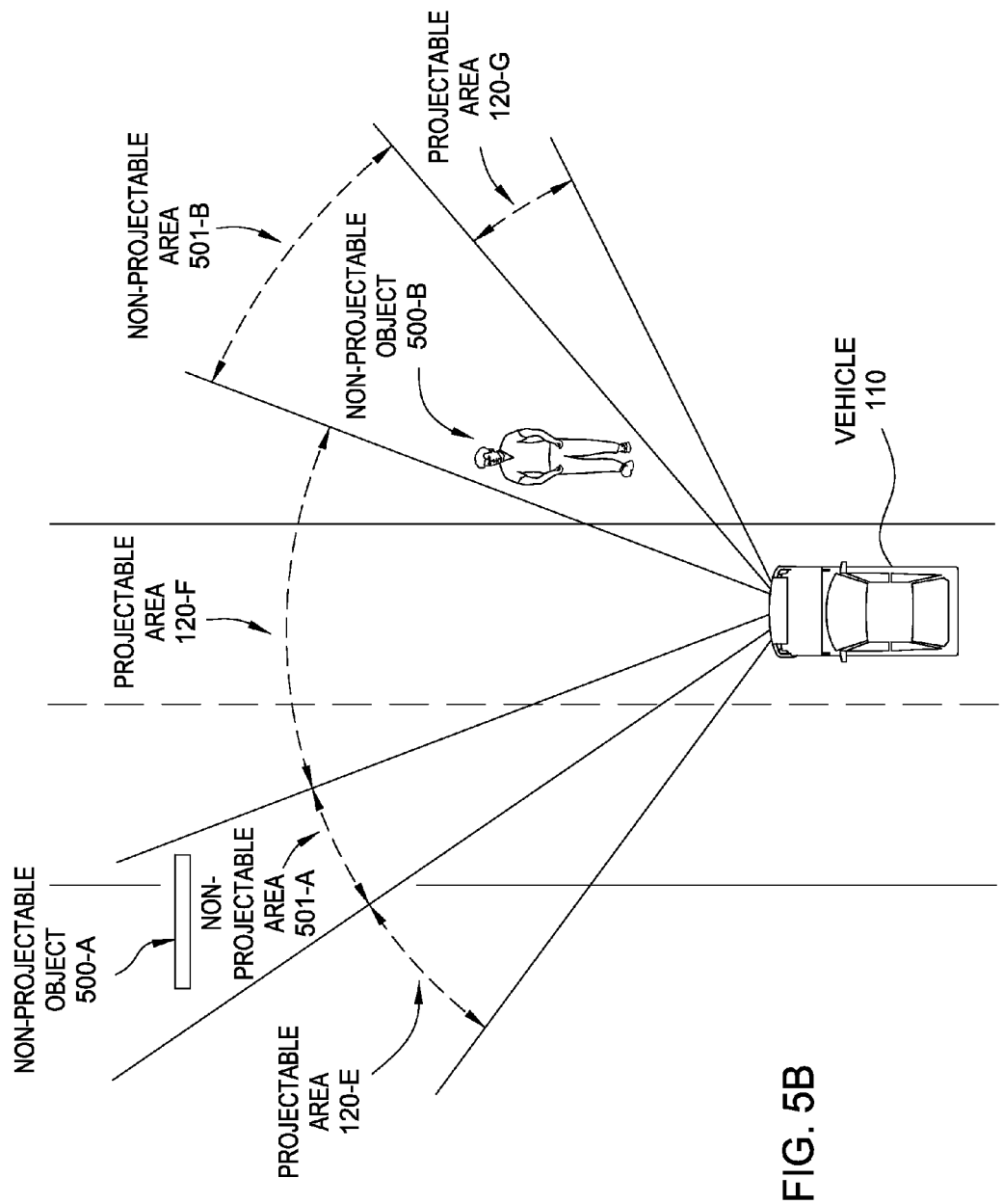

FIG. 5B illustrates projectable area 120 partitioned into projectable areas 120-E, 120-F, and 120-G, according to various embodiments of the present invention. As shown, these projectable areas straddle non-projectable areas 501-A and 501-B, which include non-projectable objects 500-A and 500-B, respectively. Roadway projection system 100 is configured to partition projectable area 120 in the illustrated fashion dynamically upon detecting any non-projectable objects 500. With this approach, roadway projection system 100 may comply with local laws and observe common courtesy.

Referring generally to FIGS. 3A-3G, roadway projection system 100 is configured to detect and respond to a wide variety of driving scenarios that driver 130 may encounter and wide variety of driving actions that driver 130 may perform. Persons skilled in the art will recognize that the examples described thus far are provided for illustrative purposes only and not meant to limit the scope of the present invention. The general functionality of roadway projection system 100 is described in stepwise fashion below in conjunction with FIG. 6.

Figure 6:
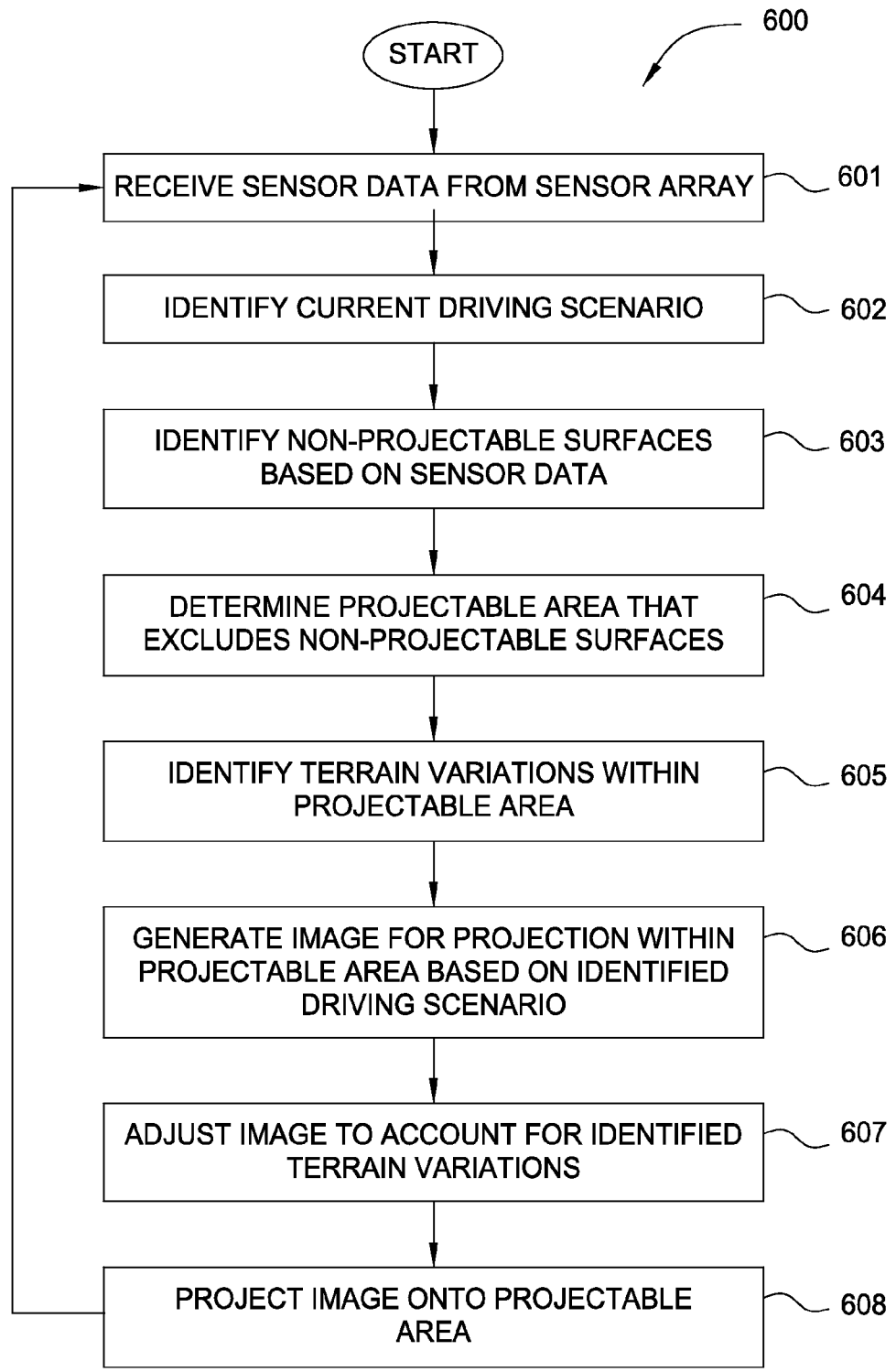
FIG. 6 is a flow diagram of method steps for projecting an image onto a roadway to assist a driver of a vehicle with a driving action, according to various embodiments of the present invention.

FIG. 6 is a flow diagram of method steps for projecting an image onto a roadway to assist a driver of a vehicle with a performing driving action, according to various embodiments of the present invention. Although the method steps are described in conjunction with the systems of FIGS. 1A-2B and FIG. 10, persons skilled in the art will understand that any system configured to perform the method steps, in any order, is within the scope of the present invention.

As shown, a method 600 begins at step 601, where computing device 103 within roadway projection system 100 receives sensor data from sensor array 102. The sensor data may include video data, ultraviolet (UV) data, infrared (IR) data, ultrasonic data, SONAR and/or LIDAR signals, range and/or depth readings, and other types of data that indicates various properties associated with an environment that surrounds vehicle 110. At step 602, computing device processes the sensor data to identify a particular driving scenario that driver 130 may have encountered, such as a merging situation or a heavy traffic. Computing device 103 may also process the sensor data to identify a particular driving action that driver 130 may be performing, including a turn or a braking action.

At step 603, computing device 103 processes the sensor data and identifies non-projectable surfaces and objects, including retroreflective surfaces, humans, and so forth. Computing device 103 may consult a database of restricted objects onto which images should not be projected, and then implement computer vision techniques to identify non-projectable objects that should be excluded from projectable area 120. Computing device 103 may also cause image projector 101 to project a brief test pattern across a panorama around vehicle 110 in order to cause any highly reflective surfaces in the panorama to momentarily reflect the test pattern. Computing device 103 may then identify the highly reflective surfaces that reflected the test pattern as non-projectable objects. At step 604, computing device 103 generates a projectable area that excludes the non-projectable objects identified at step 602. At step 605, computing device 103 identifies terrain variations within the projectable area generated at step 603. The terrain variations could be, for example, and without limitation, bumps, dips, hills, a rough driving surface, a wet driving surface, and so forth.

At step 606, computing device 103 generates an image based on the driving scenario identified at step 602 for projection onto the projectable area generated at step 604. The image may include directives or messages that assist driver 130 in performing a driving action, messages intended for drivers of other vehicles, and so forth. At step 607, computing device 103 adjusts the generated image to account for the terrain variations identified at step 605. At step 608, computing device 103 causes image projector 101 to project the image onto the projectable area. Driver 130 may then perform various driving actions with the assistance provided by directives associated with the projected image. Roadway projection system 100 may then repeat the method 600 to assist with other driving actions and situations.

By implementing the various techniques described above, roadway projection system 100 is capable of assisting driver 130 in a wide variety of different driving situations depending on the environment within which vehicle 110 travels. In addition, roadway projection system 100 may also detect and respond to images projected by other vehicles that include instances of roadway projection system 100, thereby participating in a vehicle-to-vehicle driving system. That system is described in greater detail below in conjunction with FIGS. 7A-9.

Vehicle-to-Vehicle Driving System

Figure 7A:
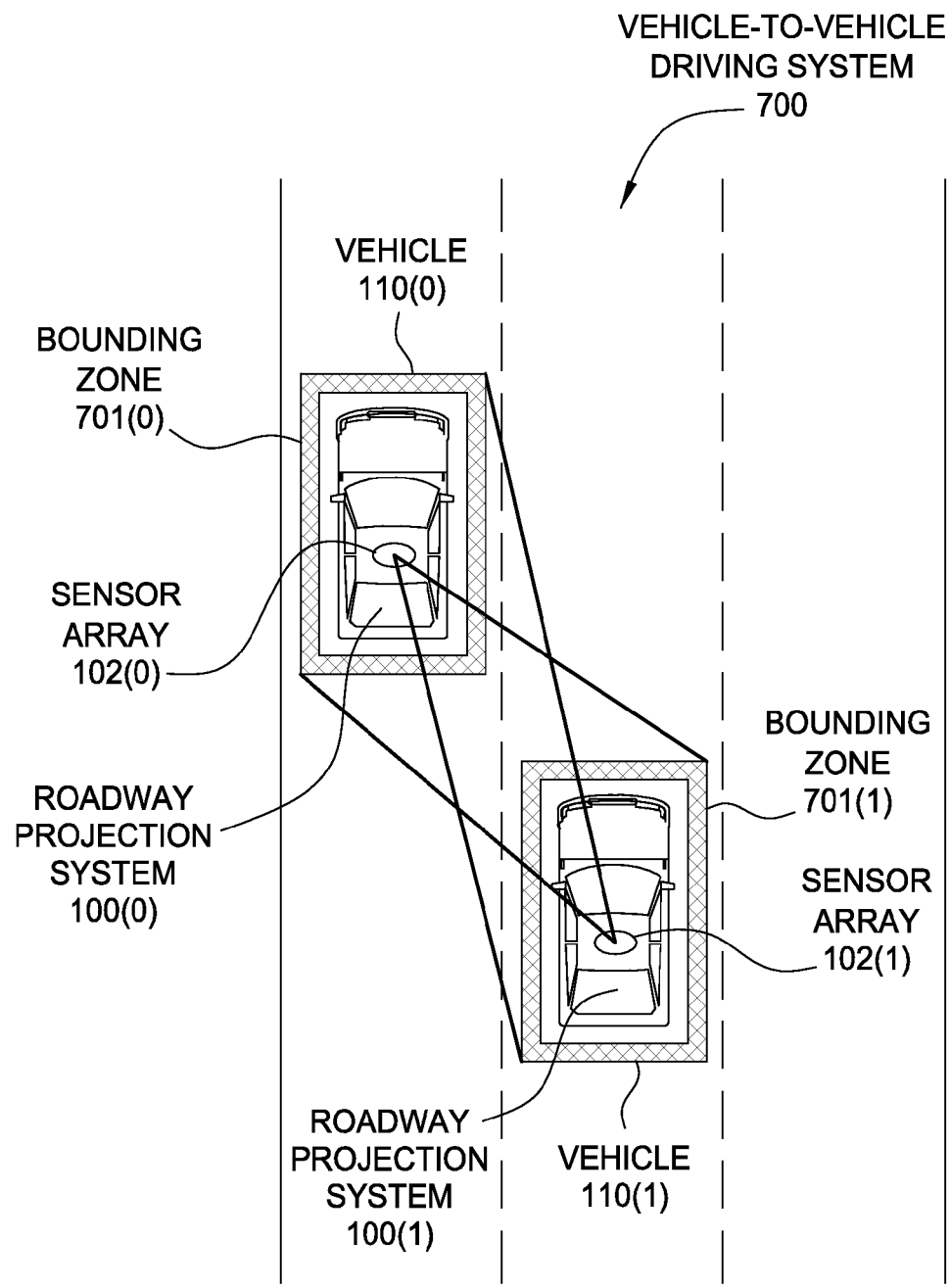
FIGS. 7A-7B illustrate an exemplary driving scenario where the roadway projection system of FIGS. 1A-2B operates as part of a vehicle-to-vehicle driving system to avoid collisions with other vehicles, according to various embodiments of the present invention.

FIG. 7A illustrates an exemplary driving scenario where roadway projection system 100 operates as part of a vehicle-to-vehicle driving system 700 to avoid collisions with other vehicles, according to various embodiments of the present invention. As shown, vehicle-to-vehicle driving system 700 includes vehicles 110(0) and 110(1). Vehicles 110(0) and 110(1) represent separate instances of vehicle 110 discussed above in conjunction with FIGS. 1A-2B. Accordingly, each such vehicle includes an instance of roadway projection system 100 of FIGS. 1A-2B. Each of vehicles 110(0 and 110(1) may be a manually-operated vehicle or an autonomous vehicle configured to perform driving actions by coordinating operations with a roadway projection system. Vehicle 110(0) includes a roadway projection system 100(0) that, in turn, includes a sensor array 102(0). Vehicle 100(0) also an image projector and a computing device, although those components have been omitted here for the sake of clarity. Likewise, vehicle 110(1) includes a roadway projection system 100(1) that, in turn, includes a sensor array 102(1), as well as other roadway projection system components not shown here for the sake of clarity.

Vehicle 110(0) is configured to project a bounding zone 701(0) onto a projectable area near vehicle 110(0). Similarly, vehicle 110(1) is configured to project a bounding zone 701(1) onto a projectable area near vehicle 110(1). Bounding zones 701(0) and 701(1) may be similar to bounding zone 341 discussed above in conjunction with FIG. 3F and, thus, may represent the preferences of the drivers of vehicles 110(0) and 110(1), respectively. In particular, bounding zone 701(0) represents a minimum separation between vehicles that the driver of vehicle 701(0) wishes to maintain, while bounding zone 701(1) represents an analogous preference of the driver of vehicle 110(1).

Roadway projection systems 100(0) and 100(1) are configured to detect the presence of bounding zones 701(0) and 701(1). Specifically, sensor array 102(0) is configured to detect bounding zones 701(0) and 701(1), and sensor array 102(1) is likewise configured to detect bounding zones 701(0) and 701(1). Roadway projection systems 100 within each vehicle 110 may then determine when an intersection between those bounding zones occurs, as described in greater detail below in conjunction with FIG. 7B.

Figure 7B:
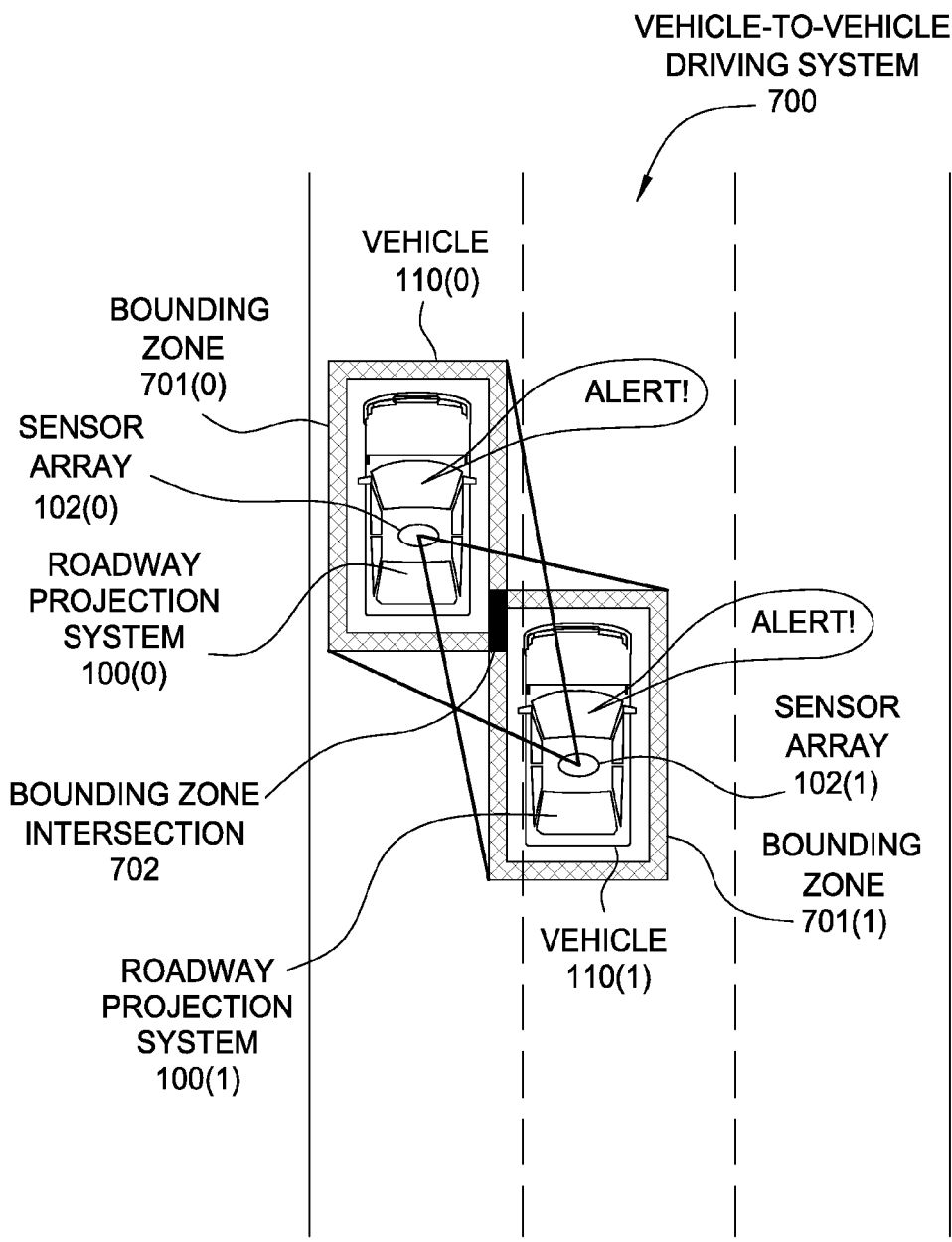

FIG. 7B illustrates an exemplary driving scenario where bounding zones 701(0) and 701(1) intersect one another, according to various embodiments of the present invention. As shown, vehicles 110(0) and 110(1) have approached one another, causing bounding zones 701(0) and 701(1) to intersect one another at bounding zone intersection 702. Vehicle 110(1) could, for example, and without limitation, have attempted to change lanes within a blind spot associated with the driver of vehicle 110(0). Roadway projection system 100(0) is configured to detect bounding zone intersection 702 and to alert the driver of vehicle 110(0) that vehicle 110(0) may be dangerously close to vehicle 110(1), thereby mitigating potentially dangerous consequences of that blind spot. In like fashion, roadway projection system 100(1) is configured to detect the intersection of bounding zones and to alert the driver of vehicle 110(1) that vehicle 110(1) may be dangerously close to vehicle 110(0).

In the context of the example discussed herein, the intersection between bounding zones 701(0) and 701(1) represents a potential disruption of the preferences shared by the drivers of vehicles 110(0) and 110(1). Specifically, the drivers of vehicles 110(0) and 110(1) prefer to maintain the minimum separation between vehicles indicated by the dimensions of bounding zones 701(0) and 701(1). However, when vehicles 110(0) and 110(1) approach one another in the fashion shown in FIG. 7B, the shared preference may be violated.

In response to detecting bounding zone intersection 702, roadway projection systems 100(0) and 100(1) may generate audio alerts, as is shown. Roadway projection system 100(0) and 100(1) may also generate other types of notifications that alert the drivers of vehicles 110(0) and 110(1). For example, and without limitation, roadway projection systems 100(0) and 100(1) could alter the appearance of bounding zones 701(0) and 701(1), respectively, or project additional images and/or animations that would direct the drivers of vehicles 110(0) and 110(1) to steer away from one another.

By implementing the vehicle-to-vehicle driving system 700 discussed herein, multiple instances of roadway projection system 100 within various vehicles are capable of interacting with one another in order to augment the sensory capabilities of the drivers of those vehicles and/or the sensors of autonomous vehicle control systems. In the example discussed herein, roadway projection system 100(0) provides information to the driver of vehicle 110(0) that reflects the blind spot of that driver. However, vehicle-to-vehicle driving system 700 may augment the sensory capabilities of drivers in other ways, as well. Specifically, under certain lighting conditions bounding zones 701(0) and 701(1) may not be clearly visible to the drivers of vehicles 110(0) and 110(1).

For example, and without limitation, on a very sunny day, bounding zones 701(0) and 701(1) may not be immediately perceptible to those drivers. However, sensor arrays 102(0) and 102(1) may be specifically tuned to detect bounding zones 701(0) and 701(1) regardless of the visibility of those zones to the human eye. Further, the image projectors within roadway projection systems 100(0) and 100(1) may emit wavelengths of electromagnetic radiation outside of the visible spectrum (or other invisible signals) that, nonetheless, may be detected by sensor arrays 102(0) and 102(1). For example, and without limitation, the image projectors within roadway projection systems 100(0) and 100(1) could emit IR radiation that would not be visible to the drivers of vehicles 110(0) and 110(1) yet, nonetheless, would be detectable by sensor arrays 102(0) and 102(1).

As a general matter, the techniques described above in conjunction with FIGS. 7A-7B may be applied to manually-operated vehicles as well as autonomous vehicles that include a roadway projection system, as mentioned. In addition, the aforementioned techniques may be implemented in the context of a manually-operated vehicle configured to occasionally perform autonomous driving actions, including, e.g., corrective steering or automatic braking, among other examples, and without limitation. When implemented in autonomous vehicles, the roadway projection system allows an autonomous vehicle that may lack a driver to express the driving intentions of the autonomous vehicle itself to other vehicles.

Vehicle-to-vehicle driving system 700 is also applicable to other driving scenarios where the drivers of vehicles 110(0) and 110(1) wish to express a mutual preference shared between vehicles, as described in greater detail below in conjunction with FIGS. 8A-8D.

Figure 8A:
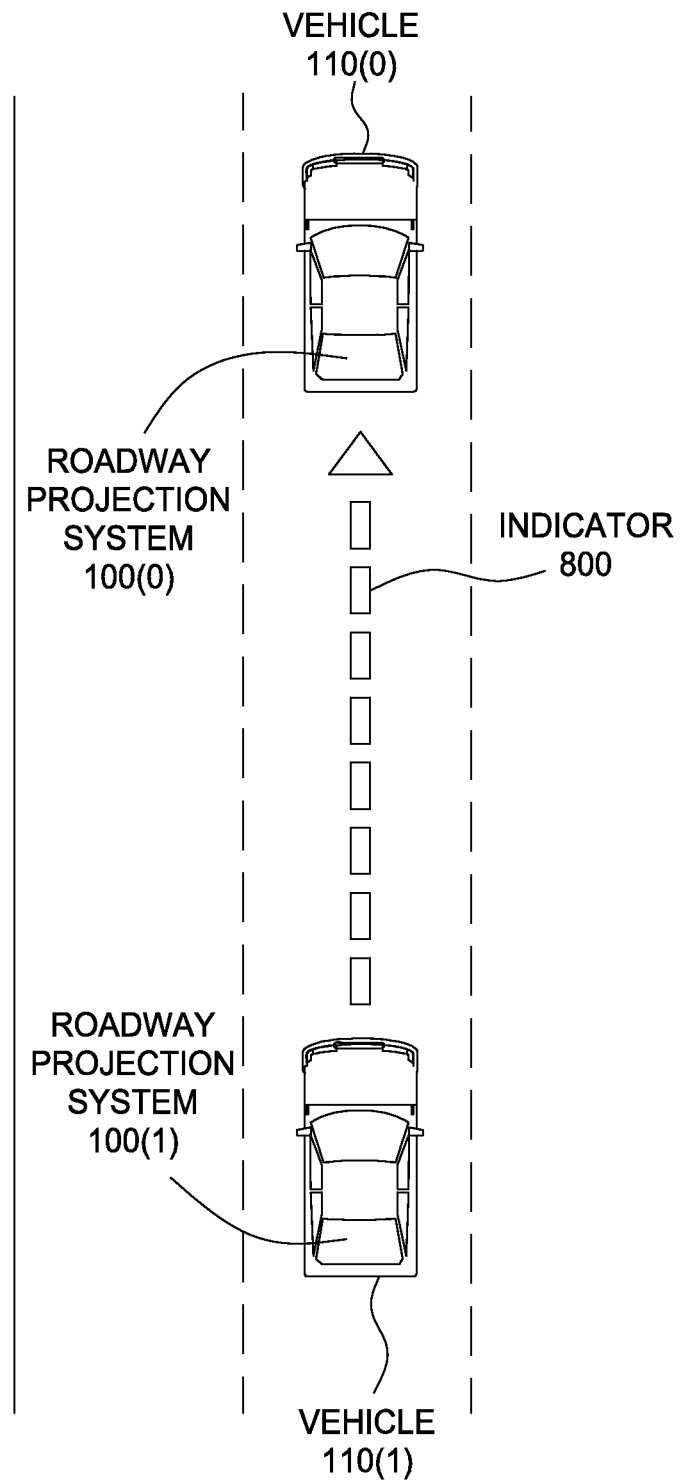
FIGS. 8A-8D illustrate exemplary driving scenarios where the roadway projection system of FIGS. 1A-2B operates as part of a vehicle-to-vehicle driving system to caravan with other vehicles, according to various embodiments of the present invention.

FIG. 8A illustrates an exemplary driving scenario where the roadway projection system 100 of FIGS. 1A-2B is configured to detect and respond to images projected by roadway projection systems in neighboring vehicles to establish a caravan of vehicles, according to various embodiments of the present invention. As shown, a vehicle-to vehicle-system 700 includes vehicles 110(0) and 110(1) of FIGS. 7A-7B. As also shown, roadway projection system 100(1) within vehicle 110(1) projects an indicator 800 that extends from vehicle 110(1) to vehicles 110(0).

Indicator 800 is an arrow signifying that vehicle 110(1) is currently following vehicle 110(0). Vehicles 110(0) and 110(1) could be caravanning with one another to a common destination, among other possibilities. Roadway projection system 110(1) projects indicator 800 in order to indicate that driver of vehicle 110(1) prefers that other vehicles avoid traveling between vehicles 110(0) and 110(1), as doing so would disrupt the caravan. Roadway projection system 100(0) within vehicle 110(0) is configured to detect indicator 800 and to notify the driver of vehicle 110(0) when that indicator has been disrupted (e.g., by another vehicle, or by vehicle 110(1) becoming otherwise separated from vehicle 110(0)). In addition, roadway projection system 100(0) may also project a reciprocal indicator, as discussed below in conjunction with FIG. 8B.

Figure 8B:
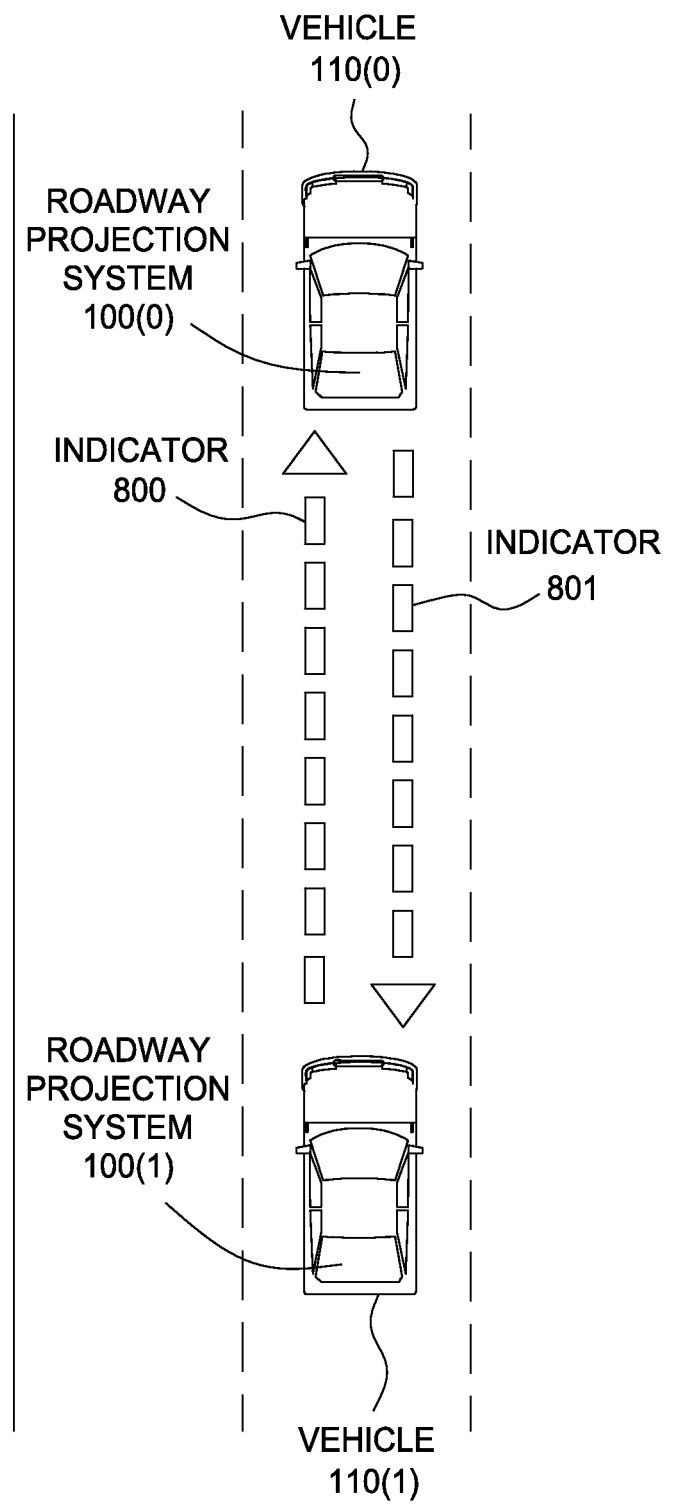

FIG. 8B illustrates an exemplary driving scenario where roadway projection system 100(0) within vehicle 110(0) projects an indicator 801 that extends from vehicle 110(0) to vehicle 110(1), according to various embodiments of the present invention. Roadway projection system 100(1) within vehicle 110(1) is configured to detect indicator 801 and to notify the driver of vehicle 110(1) when that indicator has been disrupted. With this approach, roadway projection systems 100(0) and 100(1) may establish a mutual link between one another that represents a shared preference of the drivers of vehicles 110(0) and 110(1). When that link is disrupted, the roadway projection systems 100(0) and 100 (1) are configured to notify the drivers of vehicles 110(0) and 110(1), respectively, that caravanning has been disrupted.

Figure 8C:
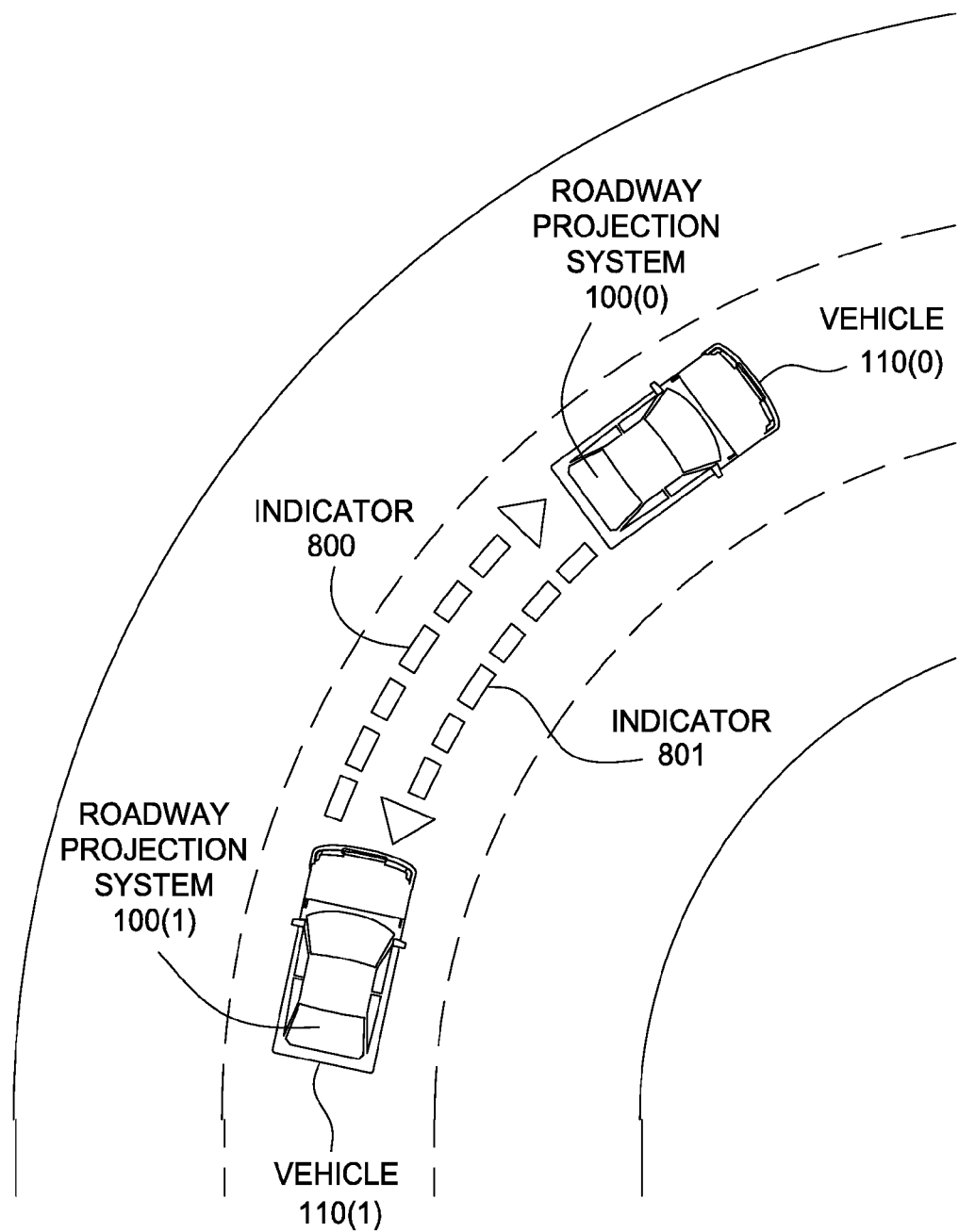
Figure 8D:
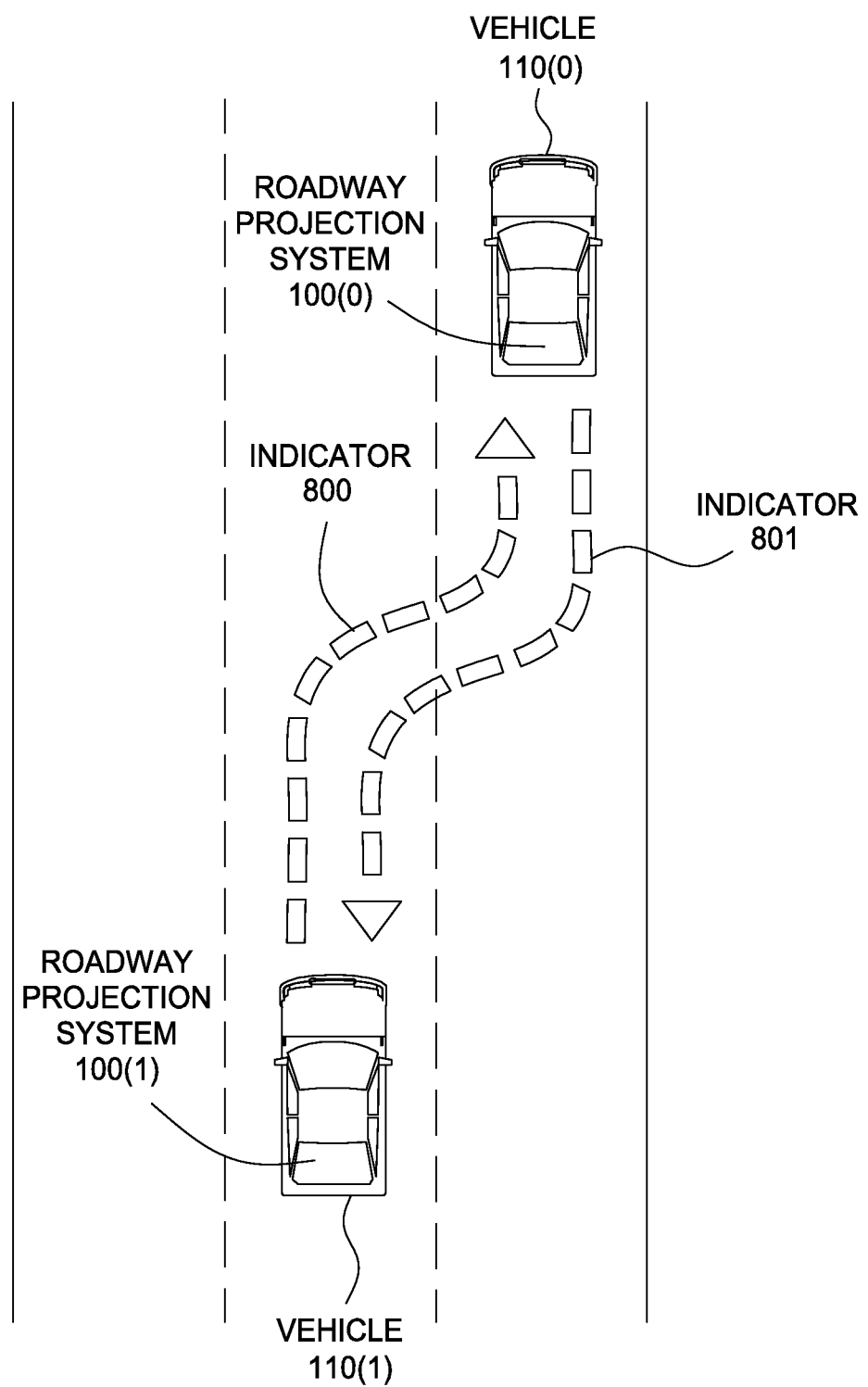

Roadway projection systems 100(0) and 100(1) are configured to maintain the mutual link established by indicators 800 and 801 through a variety of different driving conditions. For example, and without limitation, FIG. 8C illustrates roadway projections systems 100(0) and 100(1) maintaining the shared link through a curve. In another example, and without limitation, FIG. 8D illustrates roadway projection systems 100(0) and 100(1) maintaining the shared link during a lane change.

Referring generally to FIGS. 7A-8D, vehicle-to-vehicle driving system 700 may include two or more vehicles, where each such vehicle includes an instance of roadway projection system 100 of FIGS. 1A-2B configured to detect images projected by other such instances. A given roadway projection system may be configured to detect and respond to images projected by any number of other roadway projection systems. In addition, each such roadway projection system may also perform the functionality described above in conjunction with FIGS. 3A-6 while participating in vehicle-to-vehicle system 700. The general technique implemented by an instance of roadway projection system 100 when participating in vehicle-to-vehicle system 700 is described in stepwise fashion below in conjunction with FIG. 9.

Figure 9:
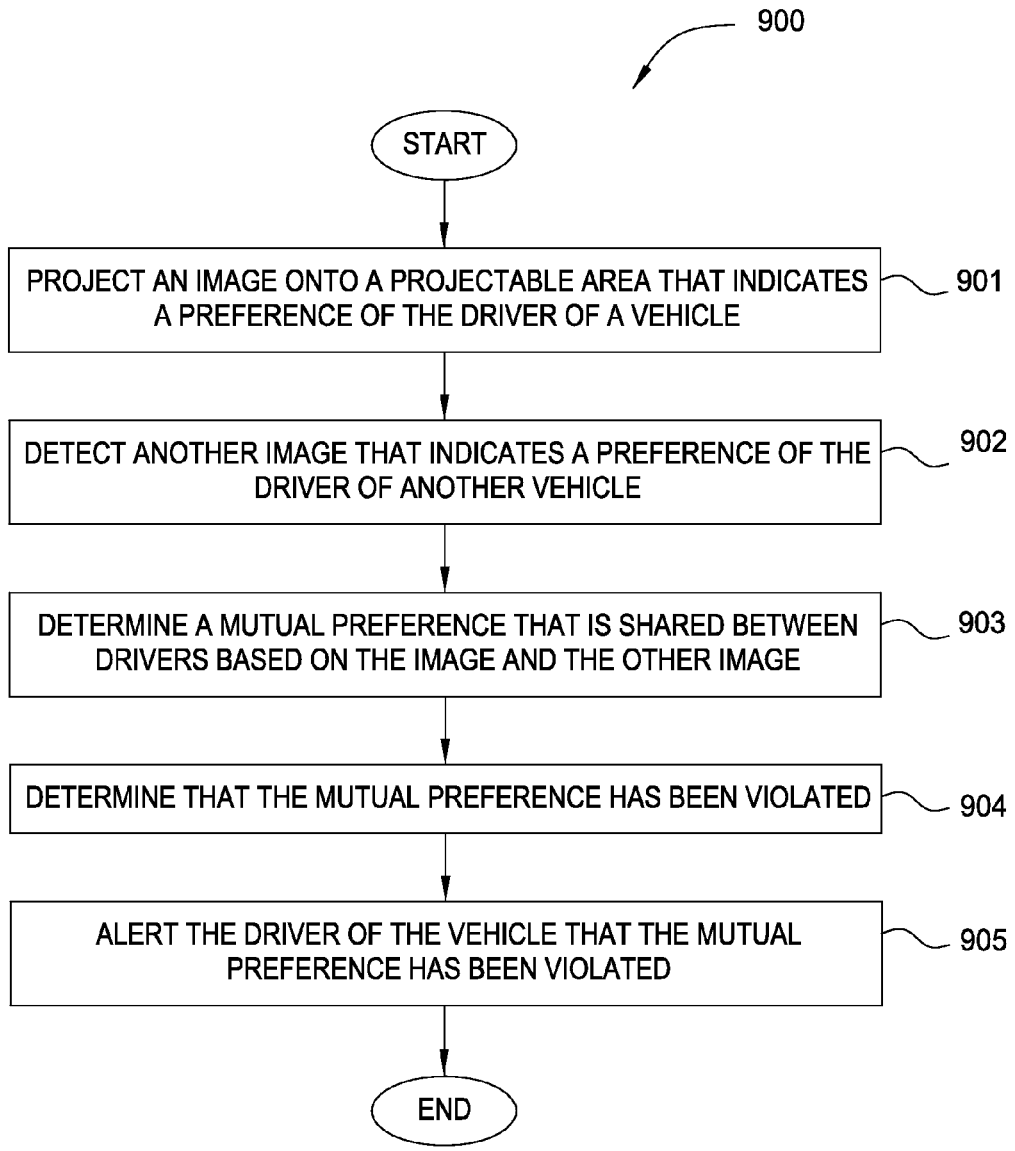
FIG. 9 is a flow diagram of method steps detecting and responding to images projected by roadway projection systems within neighboring vehicles, according to various embodiments of the present invention.

FIG. 9 is a flow diagram of method steps for detecting and responding to images projected by roadway projection systems within neighboring vehicles, according to various embodiments of the present invention. Although the method steps are described in conjunction with the systems of FIGS. 1A-2B, FIGS. 7A-8D, and FIG. 10, persons skilled in the art will understand that any system configured to perform the method steps, in any order, is within the scope of the present invention.

As shown, a method 900 begins at step 901, where roadway projection system 100 projects a first image onto a projectable area near vehicle 110 that indicates a preference of driver 130. The preference could be, for example, and without limitation, a minimum separation between vehicles that driver 130 wishes to maintain, as described in conjunction with FIGS. 3F and 7A-7B. Alternatively, the preference could be, for example, and without limitation, an indicator signifying that driver 130 wishes to caravan with another vehicle. At step 902, roadway projection system 902 detects another image projected by another roadway projection system that indicates a preference of the driver of another vehicle. The preference of the other driver could be, for example, and without limitation, a minimum separation that the other driver wishes to maintain, or an indicator signifying that the other driver desires to caravan with driver 130, as described in above in conjunction with FIGS. 7A-8D.

At step 903, roadway projection system 100 identifies a mutual preference that is shared between driver 130 and the driver of the other vehicle based on the two projected images. The projected images could be bounding zones 701(0) and 701(1) of FIG. 7, and the shared preference could reflect that both drivers wish to avoid traveling so close that those bounding zones intersect. Alternatively, the projected images could be indicators 800 and 801, and the shared preference could reflect that both drivers wish to travel in caravan without intervention from other vehicles. Roadway projection system 100 may be configured to identify a wide variety of shared preferences, including, but not limited to those discussed herein.

At step 904, roadway projection system 100 determines that the mutual preference has been violated. For example, and without limitation, roadway projection system 100 could determine that bounding zones 701(0) and 701(1) have intersected one another. Alternatively, roadway projection system 100 could determine that indicators 801 and 802 have been disrupted by another vehicle. At step 905, roadway projection system 100 alerts driver 130 that the mutual preference has been violated. Roadway projection system 100 could output an audio alert to driver 130, or project an image onto projectable area 120 indicating the violation of the mutual preference. The method 900 then ends.

Each roadway projection system within a vehicle that participates in vehicle-to-vehicle driving system 700 may implement the method 900 in order to improve the degree to which the driver of that vehicle may safely travel. Further, by implementing the method 900, roadway projection system 100 allows that driver to express a personal driving preference and establish common preferences shared with other drivers.

Persons skilled in the art will recognize that roadway projection system 100 may implement the method 900 to participate in vehicle-to-vehicle system 700 while simultaneously implementing any of the functionality described above in conjunction with FIGS. 3A-6. In particular, roadway projections system 100 may identify a projectable area 120 and project images onto that projectable area that have been adjusted to account for terrain variations while participating in vehicle-to-vehicle driving system 700. An exemplary roadway projection system 100 configured to perform the functionality described thus far is described in greater detail below in conjunction with FIG. 10.

Figure 10:
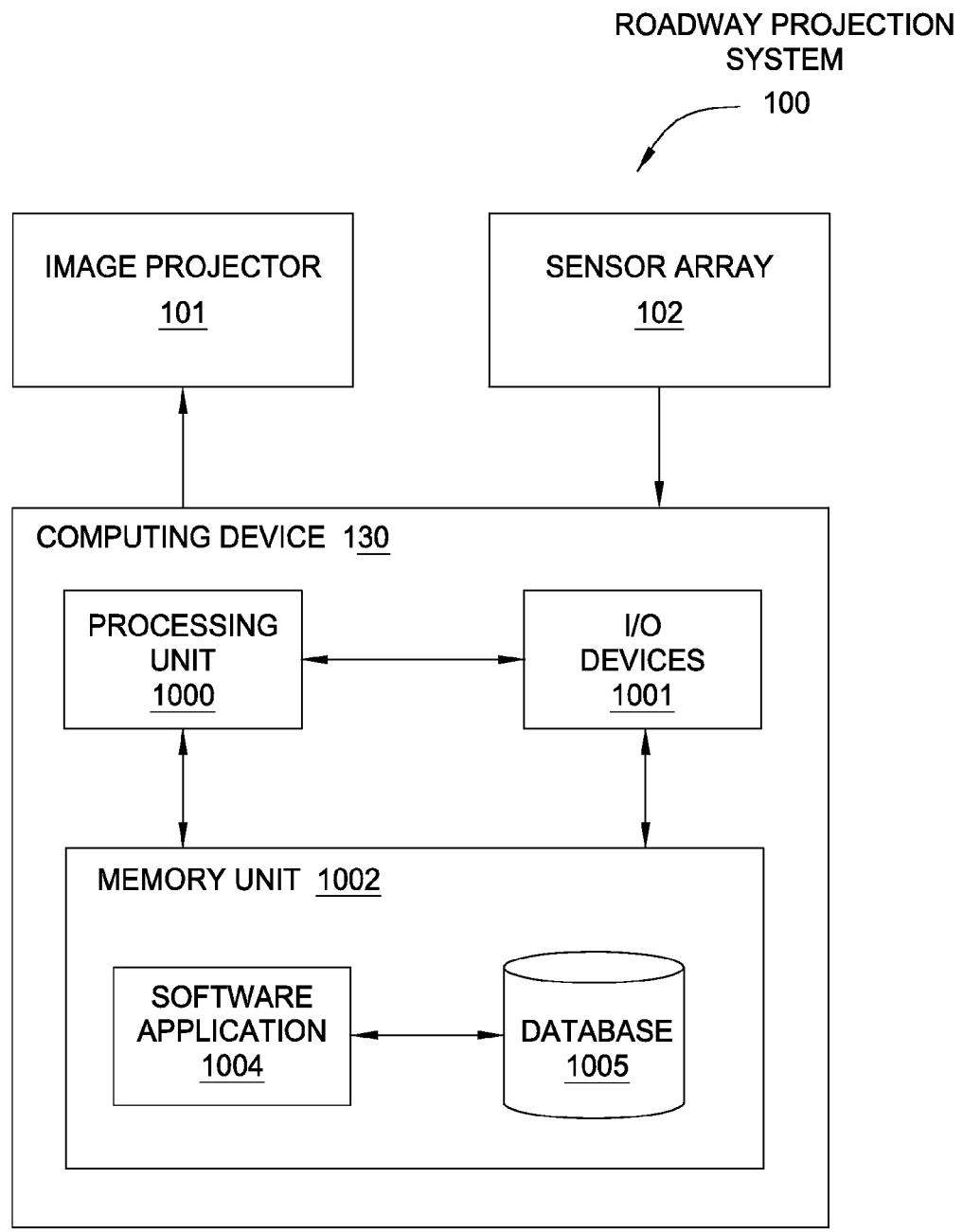
FIG. 10 illustrates a computing device configured to implement one or more aspects of the roadway projection system of FIG. 1A-2B, according to various aspects of the present invention.

FIG. 10 illustrates a computing device configured to implement one or more aspects of the roadway projection system of FIG. 1A-2B, according to various aspects of the present invention. As shown, roadway projection system 100 includes image projector 101 and sensor array 102 coupled to computing device 103. Computing device 103 includes a processing unit 1000, input/output (I/O) device 1001, and a memory unit 1002. Memory unit 1002 includes a software application 1003 coupled to a database 1004.

Processing unit 1000 may include a central processing unit (CPU), digital signal processing unit (DSP), and so forth. I/O devices 1001 may include input devices, output devices, and devices capable of both receiving input and providing output. Memory unit 1002 may be a memory module or collection of memory modules. Software application 1004 within memory unit 1003 may be executed by processing unit 100 to implement the overall functionality of computing device 103, and, thus, to coordinate the operation of roadway projection system 100 as a whole.

In sum, a roadway projection system integrated into a vehicle is configured to identify a specific driving scenario encountered by a driver of the vehicle, and to then project an image onto a roadway along which the vehicle travels based on that scenario. The image is intended to provide guidance to the driver in negotiating the identified scenario. The image could be, for example, and without limitation, an indicator that the driver should follow to perform a specific driving or navigation action, or a preference that the driver wishes to share with other drivers. In addition, the roadway projection system may detect images projected by other roadway projection systems in other vehicles and to determine mutual preferences shared between drivers. When a shared preference is violated, the roadway projection system may alert the driver of the vehicle.

One of the many advantages of the disclosed techniques is that driving assistance may be provided to the driver without requiring the driver to look away from the roadway. Since the roadway projection system is configured to project images directly on that roadway, the driver may simply follow the directives provided by those images without shifting focus away from driving. In addition, the specific types of guidance that the roadway projection system provides fall between the global navigation assistance provided by navigation systems and the instantaneous information provided by classic vehicle instruments, thereby improving upon the spectrum of information available to drivers. In addition, the roadway projection system is capable of projecting images that are visible by other drivers and other autonomous vehicles, thereby indicating intentions of the driver to those other vehicles.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A system configured to assist a driver of a vehicle with performing driving actions, the system comprising:
   a sensor array configured to gather data associated with a roadway on which the vehicle is capable of traveling;
   an image projector configured to:
      project a test pattern onto at least one surface proximate to the vehicle; and
      project images onto a projectable area associated with the roadway; and
   a computing device, configured to:
      process the data gathered by the sensor to identify a driving action that the driver is attempting to perform,
      determine a directive for assisting the driver of the vehicle with performing the driving action,
      identify, based on the test pattern projected by the image projector, one or more non-projectable objects proximate to the vehicle upon which images should not be projected,
      generate the projectable area to exclude the one or more non-projectable objects,
      generate an image that shows the directive, and
      project the image onto the projectable area.

2. The system of claim 1, wherein the non-projectable objects include at least one of humans, animals, residences, and retroreflective surfaces.

3. The system of claim 1, where the computing device is further configured to:
   identify one or more terrain variations within the projectable area; and
   adjust the image being projected to reduce distortion within the image, when viewed from a perspective of the driver, caused by the one or more terrain variations.

4. The system of claim 1, wherein the projectable area includes at least a portion of the roadway.

5. The system of claim 4, wherein the directive comprises a turn that the driver should perform.

6. The system of claim 5, wherein the image further shows a geometric apex of a curve in the roadway that can be projected along the curve in the roadway.

7. The system of claim 5, wherein the image further shows a current trajectory of the vehicle that can be projected along the curve in the roadway.

8. The system of claim 4, wherein the directive comprises a message indicating that a braking action should be performed.

9. A system configured to assist a driver of a vehicle with performing driving actions, the system comprising:
   a sensor array configured to gather data associated with a roadway on which the vehicle is capable of traveling;
   an image projector configured to project images onto a projectable area associated with the roadway; and
   a computing device, configured to:
      process the data gathered by the sensor to identify a driving action that the driver is attempting to perform,
      determine a directive for assisting the driver of the vehicle with performing the driving action, wherein the directive comprises a minimum distance between the vehicle and other vehicles that the driver of the vehicle prefers to maintain,
      generate an image that shows the directive, wherein the image shows a bounding zone that substantially surrounds the vehicle, and
      project the image onto the projectable area, wherein the projectable area includes at least a portion of the roadway.

10. The system of claim 9, wherein the computing device is further configured to:
   detect a second bounding zone projected onto the roadway by a second vehicle;
   determine that the bounding zone has intersected the second bounding zone; and
   alert the driver of the vehicle that the second vehicle is encroaching upon the minimum distance.

11. A non-transitory computer-readable medium storing program instructions that, when executed by a processing unit, causes the processing unit to assist a driver of a vehicle with negotiating driving scenarios, by performing the steps of:

gathering data associated with a varied terrain on which the vehicle is capable of traveling;

determining a directive for assisting the driver of the vehicle with negotiating a driving scenario on the varied terrain;

projecting a test pattern onto at least one surface proximate to the vehicle;

identifying, based on the test pattern that is projected, one or more non-projectable objects proximate to the vehicle upon which images should not be projected;

generating a projectable area to exclude the one or more non-projectable objects, wherein the projectable area includes at least a portion of the varied terrain;

generating an adjusted image that shows the directive for assisting the driver with negotiating the driving scenario on the varied terrain;

projecting the adjusted image onto the projectable area.

12. The non-transitory computer-readable medium of claim 11, wherein generating the adjusted image comprises:

generating an image that shows the directive for assisting the driver with negotiating the deriving scenario on the varied terrain;

mapping the varied terrain to identify a set of perturbations within the varied terrain; and adjusting the image to counteract visual artifacts potentially caused by the set of perturbations.

13. The non-transitory computer-readable medium of claim 12, wherein mapping the varied terrain comprises processing the data to generate different distance values between the vehicle and different regions of the varied terrain.

14. The non-transitory computer-readable medium of claim 11, further comprising processing the data to identify a driving scenario that the driver is attempting to negotiate on the varied terrain.

15. The non-transitory computer-readable medium of claim 11, wherein the varied terrain includes at least a portion of a roadway that includes one or more perturbations.

16. The non-transitory computer-readable medium of claim 11, wherein the non-projectable objects include at least one of humans, animals, residences, and retroreflective surfaces.

17. A computer-implemented method for visualizing a driving action to be performed by a driver of a vehicle, the method comprising:

gathering data associated with a roadway on which the vehicle is capable of traveling;

projecting a test pattern onto at least one surface proximate to the vehicle;

identifying, based on the test pattern that is projected, one or more non-projectable objects proximate to the vehicle upon which images should not be projected;

generating a projectable area to exclude the one or more non-projectable objects;

generating an image that shows a directive for assisting the driver of the vehicle with performing a driving action; and projecting the image onto the projectable area.

18. The computer-implemented method of claim 17, wherein the non-projectable objects include at least one of humans, animals, residences, and retroreflective surfaces.

19. The computer-implemented method of claim 17, further comprising:

identifying one or more terrain variations within the projectable area; and adjusting the image being projected to remove distortion within the image caused by the one or more terrain variations.

20. The computer-implemented method of claim 17, wherein the directive comprises information related to at least one of navigating the vehicle to a destination, steering the vehicle through a turn, merging the vehicle with traffic, and driving the vehicle in traffic.

\* \* \* \* \*